United States Patent
Matsui et al.

(10) Patent No.: US 7,291,262 B2
(45) Date of Patent: Nov. 6, 2007

(54) ROAD SURFACE WASTE WATER TREATMENT DEVICE AND TUBULAR WATER TREATMENT UNIT

(75) Inventors: Saburo Matsui, Kyoto (JP); Shinobu Kobayashi, Takefu (JP); Sadakatsu Kimura, Takefu (JP)

(73) Assignee: Hokukon Co., Ltd., Takefu-shi, Fukui (JP)

( * ) Notice: Subject to any disclaimer, the term of this patent is extended or adjusted under 35 U.S.C. 154(b) by 360 days.

(21) Appl. No.: 10/275,419

(22) PCT Filed: May 25, 2001

(86) PCT No.: PCT/JP01/04397

§ 371 (c)(1),
(2), (4) Date: Oct. 3, 2003

(87) PCT Pub. No.: WO01/89998

PCT Pub. Date: Nov. 29, 2001

(65) Prior Publication Data

US 2003/0089652 A1    May 15, 2003

(30) Foreign Application Priority Data

May 25, 2000  (JP)  .............................. 2000-154797
May 25, 2000  (JP)  .............................. 2000-154798

(51) Int. Cl.
*E03F 5/14*  (2006.01)
(52) U.S. Cl. .................. 210/170.03; 210/254; 210/265; 210/311; 210/532.1; 404/4
(58) Field of Classification Search ................ 210/256, 210/265, 163, 164, 170.03, 254, 311, 532.1, 210/534, 535; 404/4, 5
See application file for complete search history.

(56) References Cited

U.S. PATENT DOCUMENTS

| 1,601,611 | A | * | 9/1926  | Downey ...................... 210/265 |
| 4,966,718 | A | * | 10/1990 | Johnson ...................... 210/776 |
| 5,433,845 | A | * | 7/1995  | Greene et al. ......... 210/170.03 |
| 5,725,760 | A | * | 3/1998  | Monteith ............... 210/170.03 |
| 5,746,911 | A | * | 5/1998  | Pank ..................... 210/170.03 |
| 6,077,448 | A | * | 6/2000  | Tran-Quoc-Nam et al. ....................... 210/532.1 |

(Continued)

FOREIGN PATENT DOCUMENTS

JP         59-183972         12/1984

(Continued)

*Primary Examiner*—Christopher Upton
(74) *Attorney, Agent, or Firm*—Flynn, Thiel, Boutell & Tanis, P.C.

(57) ABSTRACT

The invention provides a runoff water purification system for removing pollutants which accumulate on road surfaces, thereby reducing the workload of the sewage water treatment plants and preventing environmental water pollution. The system 1 is installed under the ground of the side of the road 2. Runoff water runs into the system 1 through a curb inlet 120, is purified and discharged to a sewage pipe 56. The system is made up of a concrete box 11, in which a wall 10 separates the box into a maintenance tank 7 and a treatment tank 9, both of which are connected to each other at their lowest ends. Runoff water flows into the maintenance tank 7 and to the treatment tank 9, through the connecting conduit where pollutants are removed, and discharged to the sewage pipe.

8 Claims, 42 Drawing Sheets

U.S. PATENT DOCUMENTS 6,337,025 B1 * 1/2002 Clemenson ................ 210/163

FOREIGN PATENT DOCUMENTS

| JP | 60-66772 | 5/1985 |
| --- | --- | --- |
| JP | 60-76181 | 5/1985 |
| JP | 60-159083 | 10/1985 |
| JP | 63-86894 | 6/1988 |
| JP | 5-37303 | 5/1993 |
| JP | 07-102623 | 4/1995 |
| JP | 3311732 | 5/2002 |

* cited by examiner

ROAD SURFACE WASTE WATER TREATMENT DEVICE AND TUBULAR WATER TREATMENT UNIT

FIELD OF THE INVENTION

This invention is in the field of systems for removing pollutants from drainage water, such as runoff from city streets, house drainage, factory drainage and from rice fields or the like.

BACKGROUND OF THE INVENTION

Pollutants from the exhaust gas of automobiles, especially from diesel engine vehicles, abraded tire dust, asphalt dust, and further, a large volume of pollutants contained in the flue gas from industries accumulate on road surfaces. These pollutants include organic pollutants, such as polycyclic aromatic-hydrocarbons, heavy metals such as chrome and cadmium, nutrients such as nitrogen and phosphorus, which cause eutrophication, and further include materials of potential environmental hormones. These pollutants and the like are washed out by rainfall and pass into storm drains adjacent to paved surfaces, such as streets and parking lots and through curb inlets, and flow into the sewage systems or into the rivers.

Larger spills of oil can also flow into storm drains, such as from loading docks, gas stations, and the like. In addition, quantities of oil or other hydrocarbons are frequently spilled on the ground and subsequent water flow, such as from rain, can cause the oil to flow into storm drains. This is referred to as "non-point-source pollution."

The volume of oil from non-point-source pollution in typical water runoff is surprisingly large and consequently, cause enormous annual costs, both financial and environmental, by contaminating natural receiving waters.

When the sewage system is a combined flow system, pollutants are treated and disposed of at the sewage treatment plants. But if the pollutants include heavy metals, such as chrome or cadmium, the sludge needs a special treatment.

On the other hand, when the sewage system is a separate flow system, road surface run-off water containing pollutants flows into the rivers with no proper treatment, the pollutants potentially cause a eutrophication or environmental water pollution, and causes a disruption of the ecosystem.

The chemicals, such as insecticides or herbicides, in the effluent from rice fields or the like, and the suspension solids caused by plowing the rice fields for young rice plants flow into the rivers and cause water pollution.

DISCLOSURE OF THE INVENTION

It is a primary object of the present invention to achieve an effective system for removing pollutants accumulating on road surfaces and being washed by rainfall, for reducing the workload of sewage water treatment plants and for preventing environmental water pollution.

It is another object of the invention to prevent environmental water pollution by removing chemicals, such as insecticides or herbicides, in the effluent from the rice fields or the like, and suspension solids caused by plowing the rice fields for young rice plants.

It is another object of the invention to provide a compact and easy-maintenance system for effectively removing pollutants flowing into curb-inlet storm drains, over a wide range of flow rates.

The present invention achieves the above and other objectives by use of a compact drainage purification unit connected to curb-inlet storm drains having a composite collection system for pollutants accumulated on the road surfaces. The road surface drainage system of this invention for removing the pollutants on the road surfaces comprises a maintenance tank and a treatment tank, and both tanks are connected to each other at their lower ends with a connecting conduit.

Run-off water washing the pollutants from the road surfaces flows into the maintenance tank through an inlet connected to a curb inlet and into the treatment tank, in which the water treatment materials are packed. Pollutants are removed while the water flows up the treatment tank by being absorbed by water treatment materials having a high surface area and the purified water flows out from an outlet disposed at the top of the apparatus. Water flows by gravity without using a water pump or the like, subsequently, the outlet is disposed below the inlet level. As the upper side of the maintenance tank is opened, it is easy to remove sediment from the bottom of the maintenance tank.

In this specification, the term "road-surface run-off water" refers to water drainage on the road surface or the like caused by rain and the road surface refers to any place or space where a vehicle can move, for instance a parking lot and a sidewalk.

The term pollutants refers to any kind of pollutant existing on the road surface, for instance, a small particle or dust in the diesel engine emission, pneumatic rubber tire dust, asphalt dust and further, a large volume of pollutants contained in flue gas from industries, more particularly, organic pollutants, such as polycyclic aromatic-hydrocarbons, heavy metals such as chrome and cadmium, eutrophic nutrients, such as nitrogen and phosphorus, and further include materials of potential environmental hormones. These pollutants are accumulated on the road surfaces and carried to the side of the road by rainfall.

BRIEF DESCRIPTION OF THE DRAWINGS

Common numerals are used in the several figures to indicate similar elements.

DETAILED DESCRIPTION BEST MODE OF THE INVENTION

Embodiment 1

Figure 1:
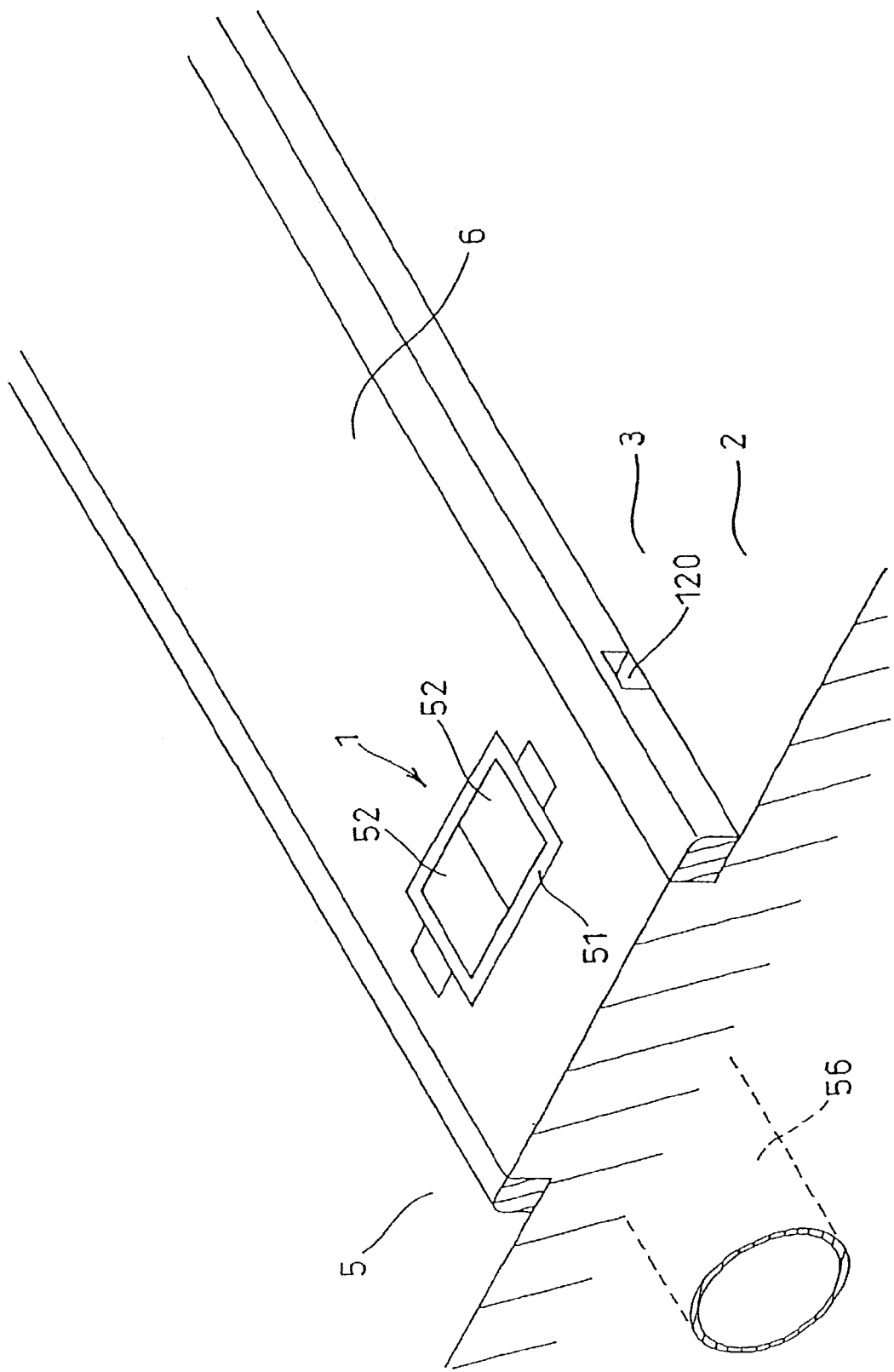
FIG. 1 is a perspective view of a curb-inlet storm drain with an embodiment of the system installed.

As illustrated in FIG. 1, the water treatment apparatus 1 of the invention is installed underneath the ground at a distance of 20 m in an area 6 between the road-side 3 of the road 2 and a sidewalk 5, where plants are planted. The top of the apparatus 1 is adjusted to ground level and the apparatus is covered by a cover plate 52 placed in a support frame 51. Road surface water runs into the apparatus 1 through a curb inlet 120, is purified while passing through the apparatus and exits from an outlet to the sewage pipe 56.

Figure 2:
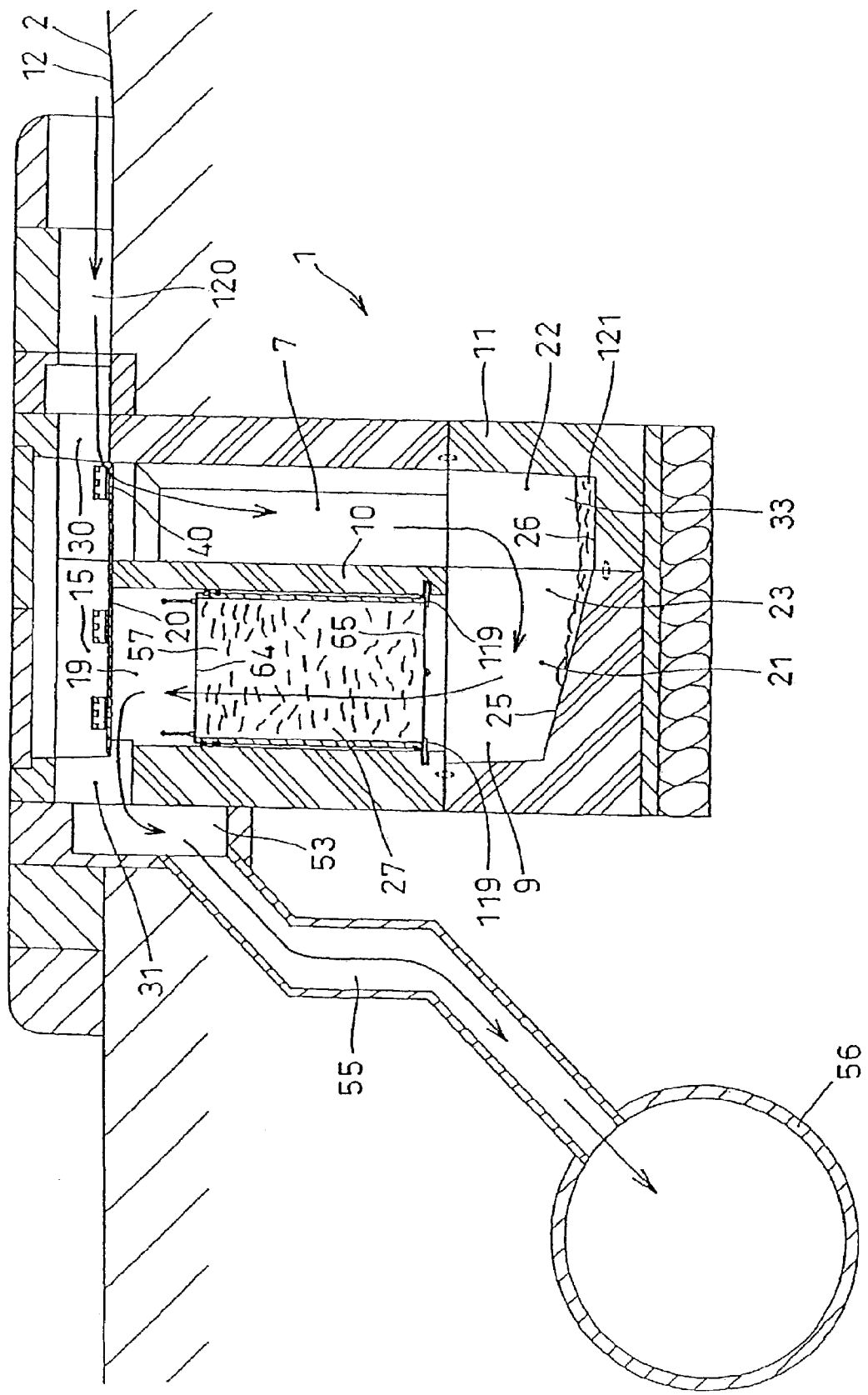
FIG. 2 is a cross-section view of a road surface drain system.

As illustrated in FIG. 2, the water purification apparatus 1 of the invention comprises a concrete block 11, the inside of which is separated by a wall 10 and also has formed therein a maintenance tank 7 and a treatment tank 9, both of which are connected at their lower ends, thereby, the drain water from the road surfaces flows into the maintenance tank 7 indicated by arrows in FIG. 2, then flows downward in the maintenance tank 7, flows upward passing through the water treatment tank 9, the pollutants are removed by the water purification materials 57 and the purified water is discharged to a pipe 56.

Figure 4:
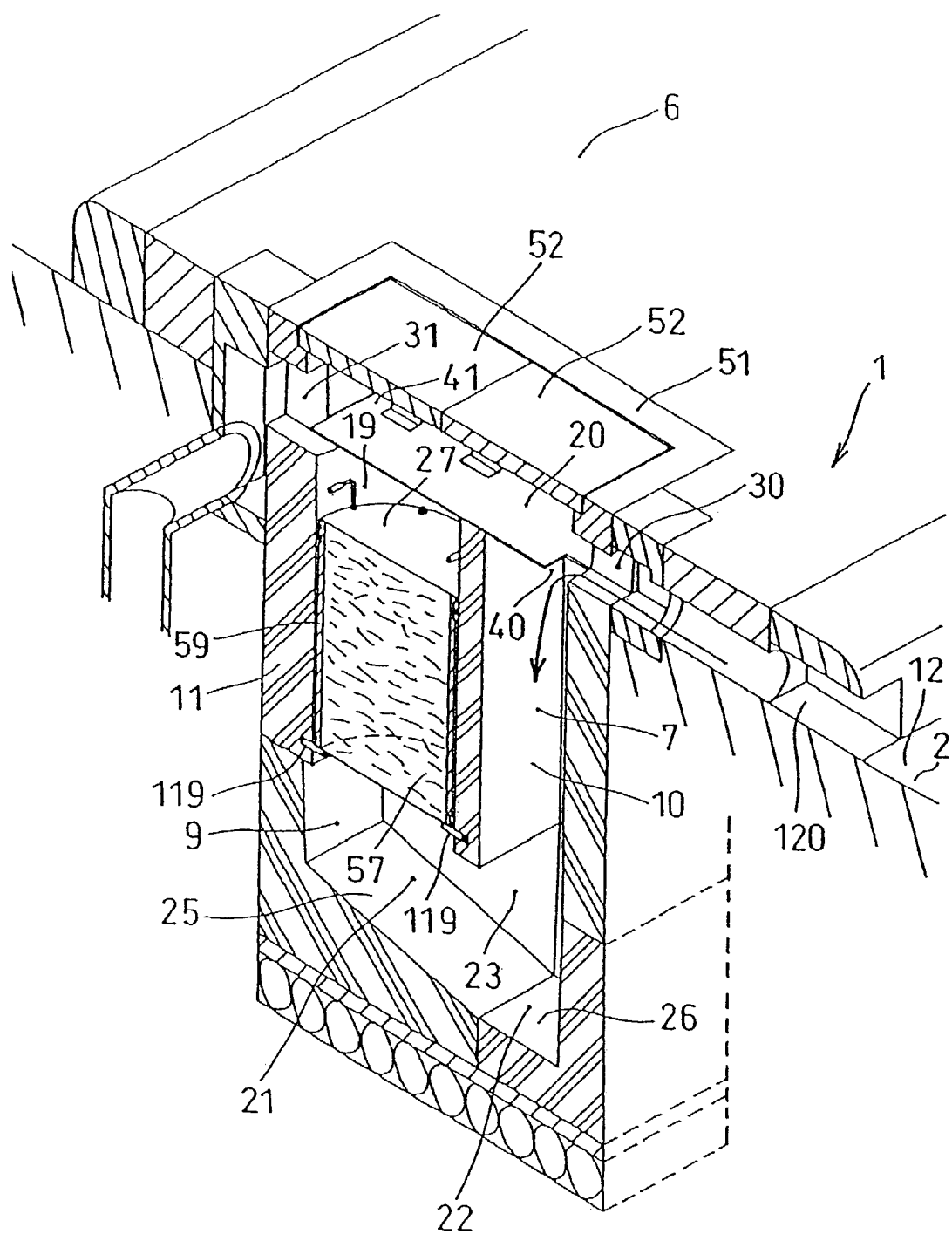
FIG. 4 is a perspective and a partially cross-sectional side view of the system.
Figure 5:
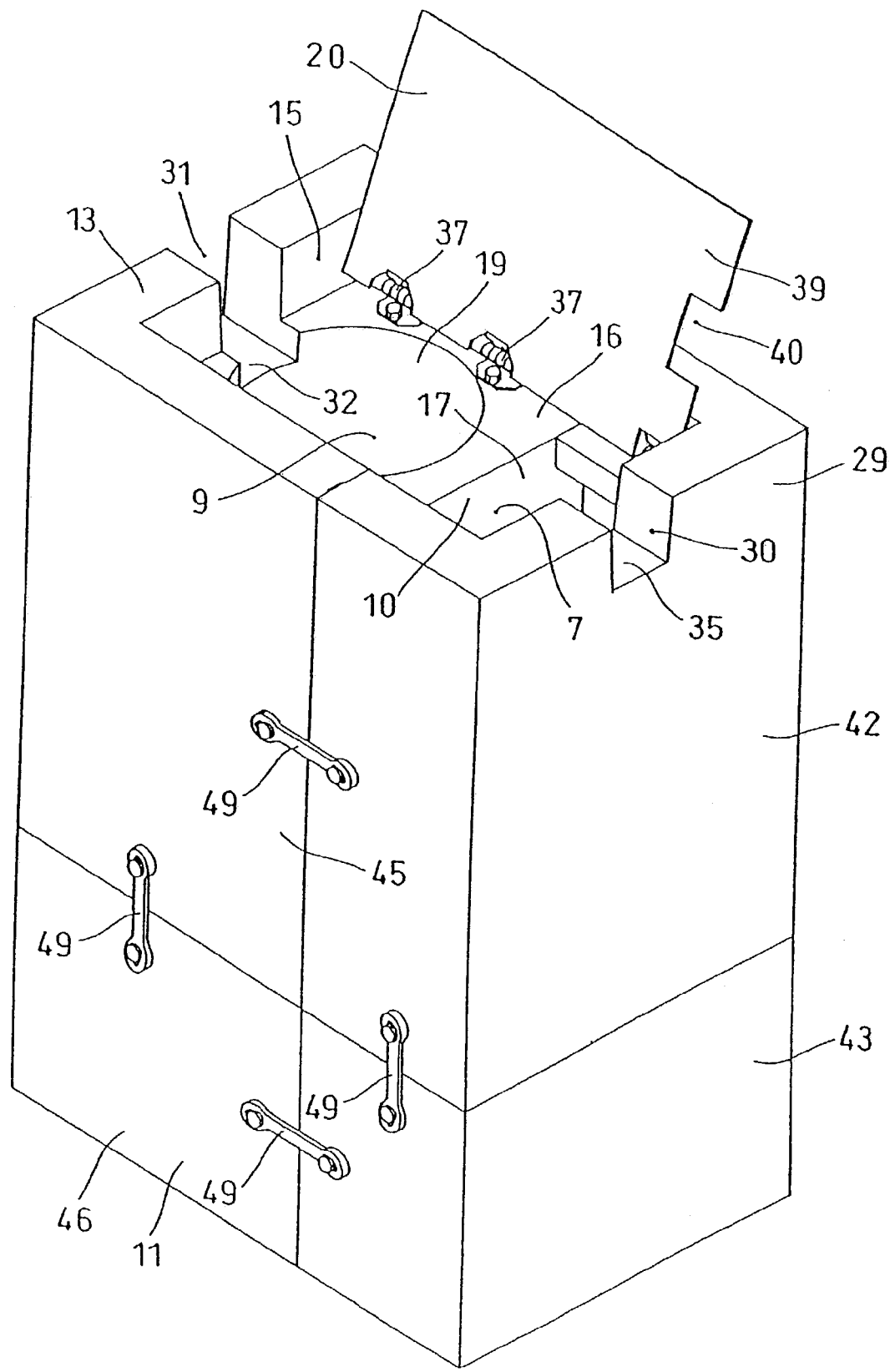
FIG. 5 is a perspective view of a box showing a cover plate opened.

The concrete box 11 extends vertically and, as illustrated in FIG. 5, there is provided a wall 13 therearound and inside space 15 is surrounded by the wall 13. There is provided openings 17, 19 of the maintenance tank 7 and of water treatment tank 9 respectively at the bottom 16 of the space 15. A detachable cover 20 closes both openings 17, 19 at the same time. The maintenance tank 7 has a square cross-sectional area and extends vertically and the treatment tank 9 has a round cross-sectional area and also extends vertically. As shown in FIG. 2 and FIG. 4, the lower end of the partition wall 10 is opened, thereby forming a connection conduit 23 and thereby both of the tanks 7, 9 communicate with each other. The bottom 25 of the treatment tank 9 has a downward slope toward the maintenance tank 7, and a treatment materials container 27 is detachably installed inside the treatment tank 9, the container 27 can be taken out from the opening 19 disposed at the top.

As illustrated in FIG. 5, the wall 13 is cut off to form an inlet 30 and an outlet 31. A bottom level 32 of the outlet 31 is lower than a bottom level 35 of the inlet 30 and thereby the treated water in the treatment tank 9 flows out automatically by gravity.

Figure 6:
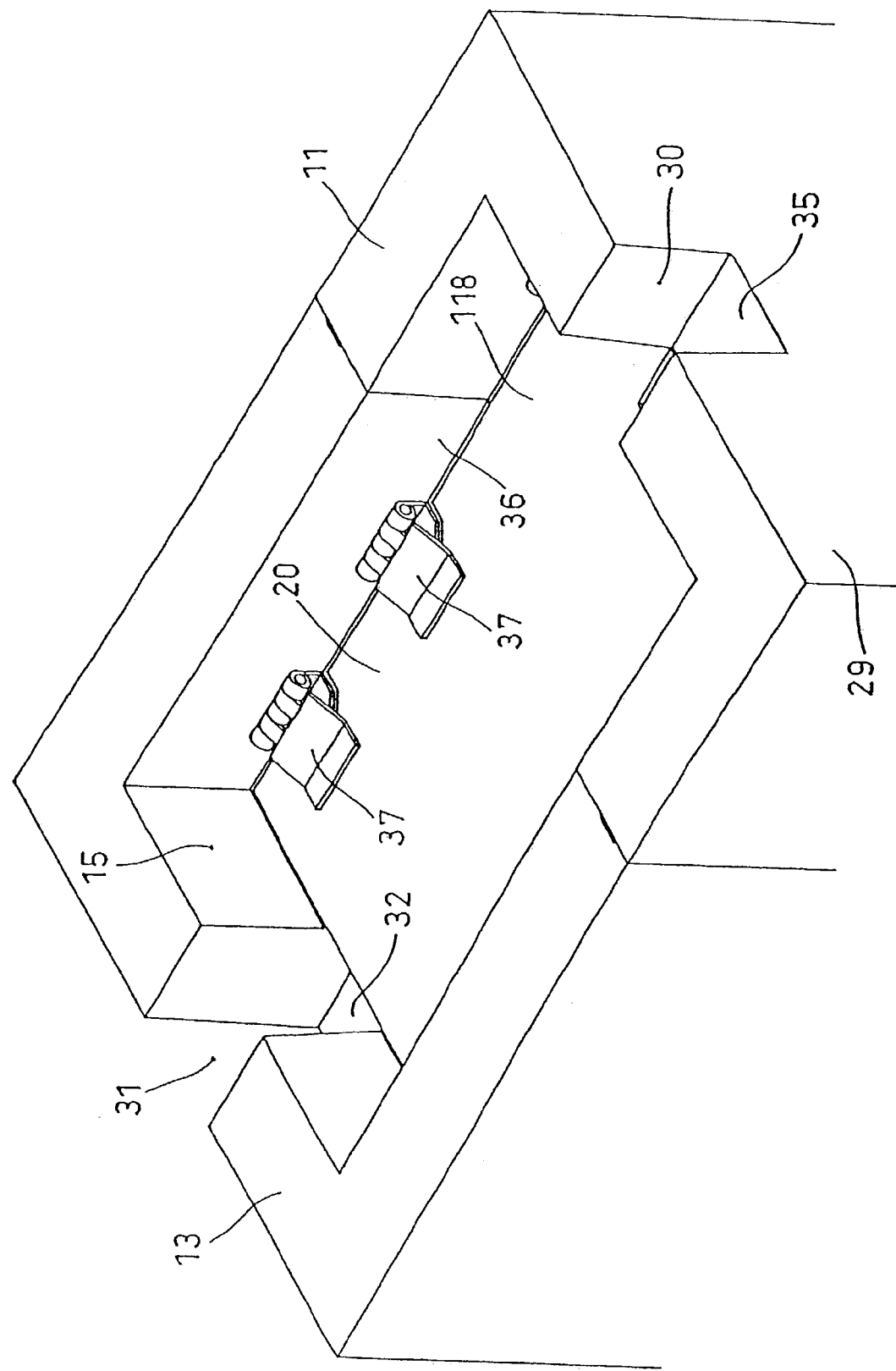
FIG. 6 is a perspective view of a box showing a cover plate closed.

As illustrated in FIG. 5, the cover plate 20 is a square flat plate, having a dimension capable of covering two openings 17, 19 and as illustrated in FIG. 6, the cover plate 20 is hinged to the outer wall 13, capable of closing and opening the two openings 17, 19 at the same time. When the cover plate 20 is closed, the cover plate 20 closely contacts the bottom base 16 for sealing.

As illustrated in FIG. 4 and FIG. 5, the cover plate 20 has a cut off 40 corresponding to the inlet 30 of the apparatus 1, thereby the water flows into the maintenance tank 7 through the inlet 30 and the cut off 40 as an arrow in FIG. 4 indicates.

Figure 3:
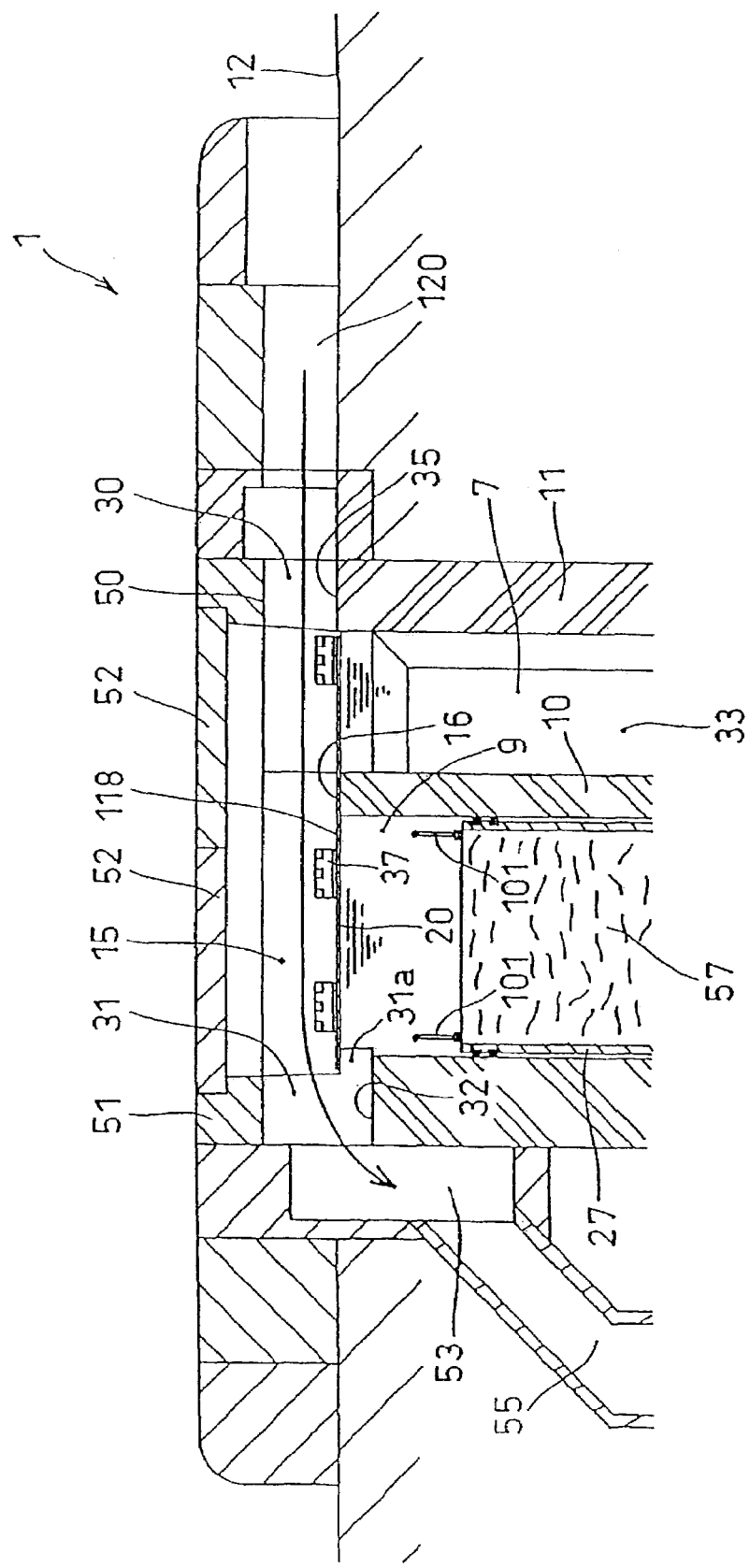
FIG. 3 is an enlarged cross-sectional view of an upper portion of a road surface drain system.
Figure 7:
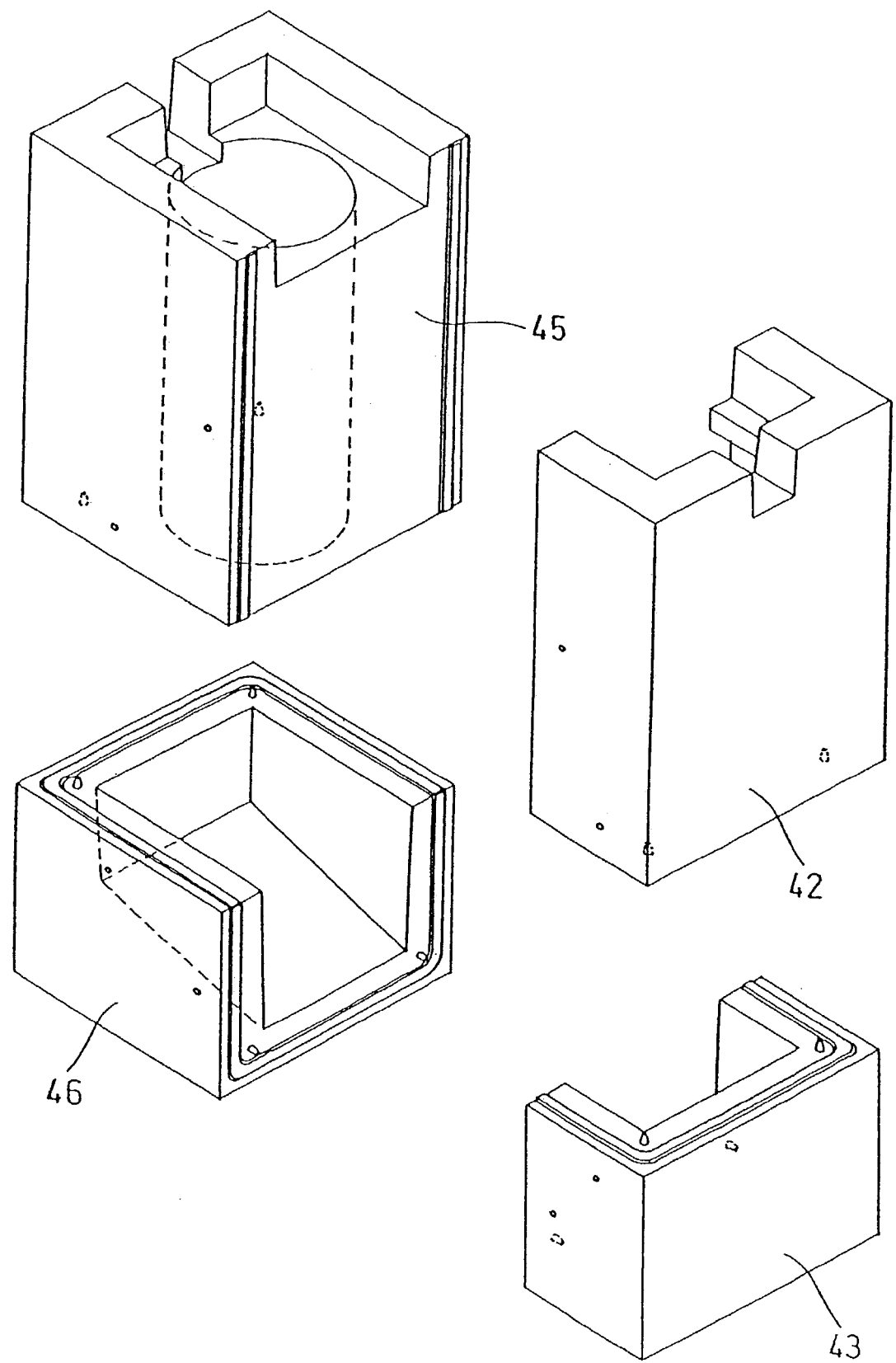
FIG. 7 is a perspective detail view of the concrete block components of the box.
Figure 8:
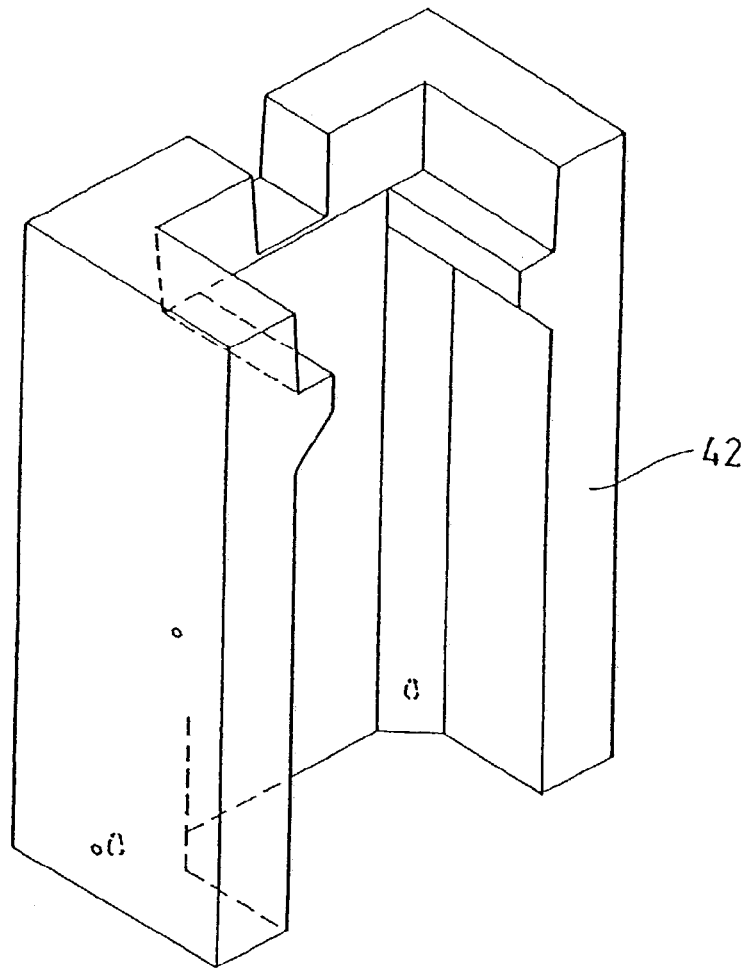
FIG. 8 is a perspective detail view of the concrete block components of the maintenance tank.
Figure 8:
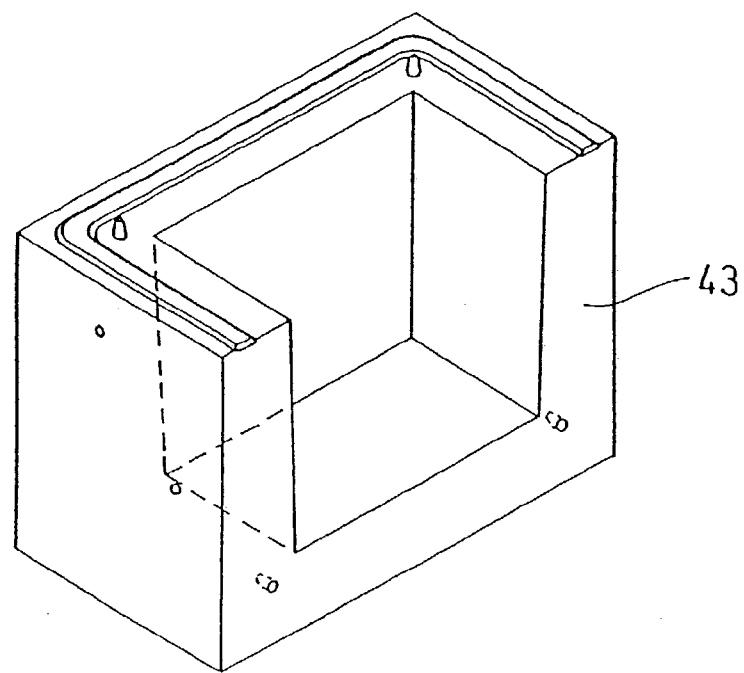
Figure 9:
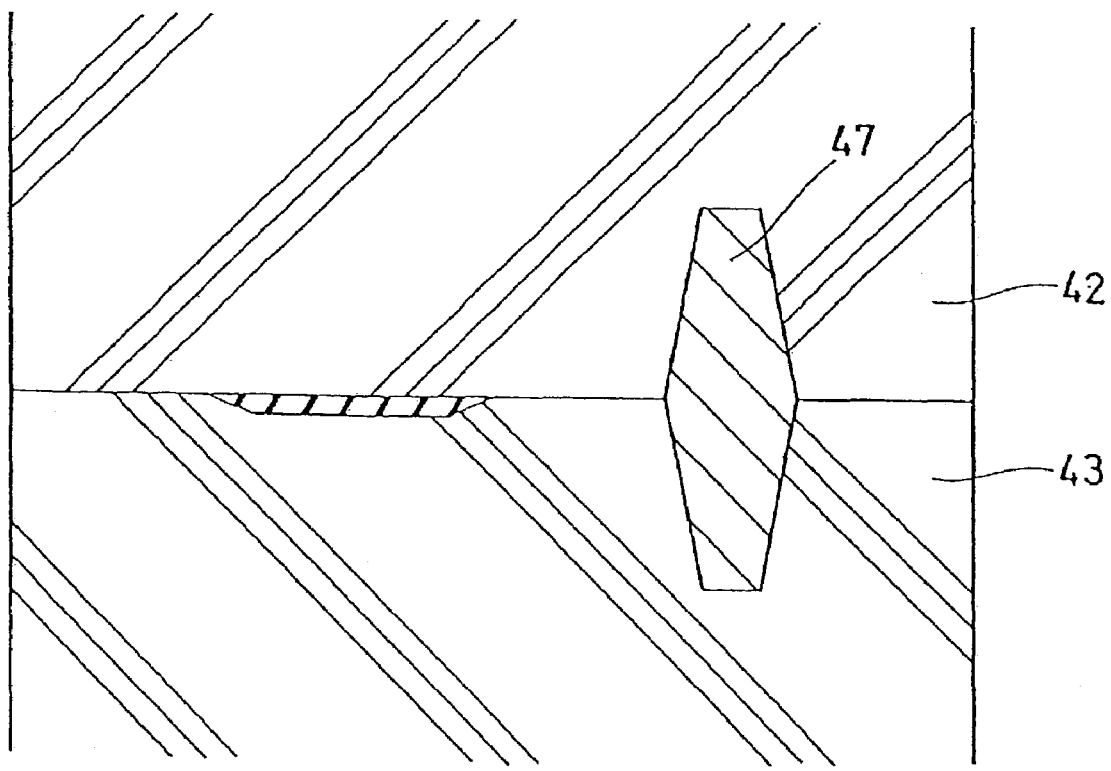
FIG. 9 is a cross-sectional view of the block being connected with a connecting pin.

The concrete box 11 may be formed as one solid body, but as shown in FIG. 5, FIG. 7 and FIG. 8, it can be composed of four component blocks 42, 43, 45, 46 which are connected to form a complete box, using connecting pins 47 as shown in FIG. 9. At the top of the box 11, as shown in FIG. 1, FIG. 3, and FIG. 4, a frame 51 is installed and two cover plates 52, 52 are placed over the cover 20 plate. As shown in FIG. 5, the cover plates 52, 52 are removed from the frame, for opening the cover plate 20.

Purified water in the treatment tank 9 exists from the outlet 31, flows into the outlet box 53, and flows out to the sewage pipe 56 through the discharge conduit 55.

Figure 10:
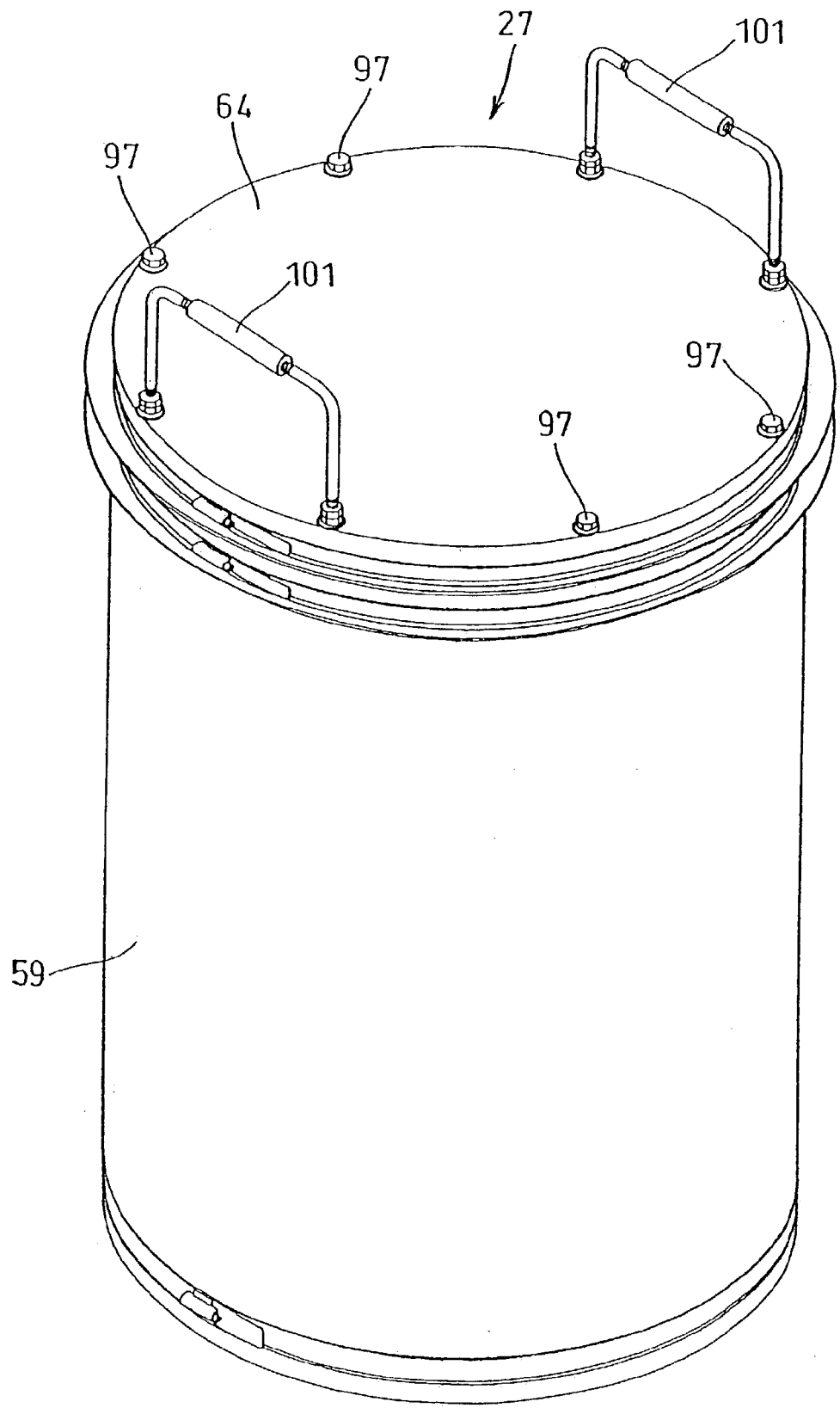
FIG. 10 is a perspective view of a treatment materials container.

As shown in FIG. 4 and FIG. 10, a container 27 is filled with treatment materials which absorb and entrap or filter a high quantity of pollutants, for instance, oil and other chemicals passing through the container 27, while permitting a high water flow-through rate. It is preferable to select small fragments of foam polypropylene, which has a low density and high ability of absorbing oily materials such as asphalt, and easy to wash. Well-known absorbents, such as ceramics or activated carbon may also be applicable as treatment materials. A proper material should be selected depending on the pollutants to be removed.

Figure 11:
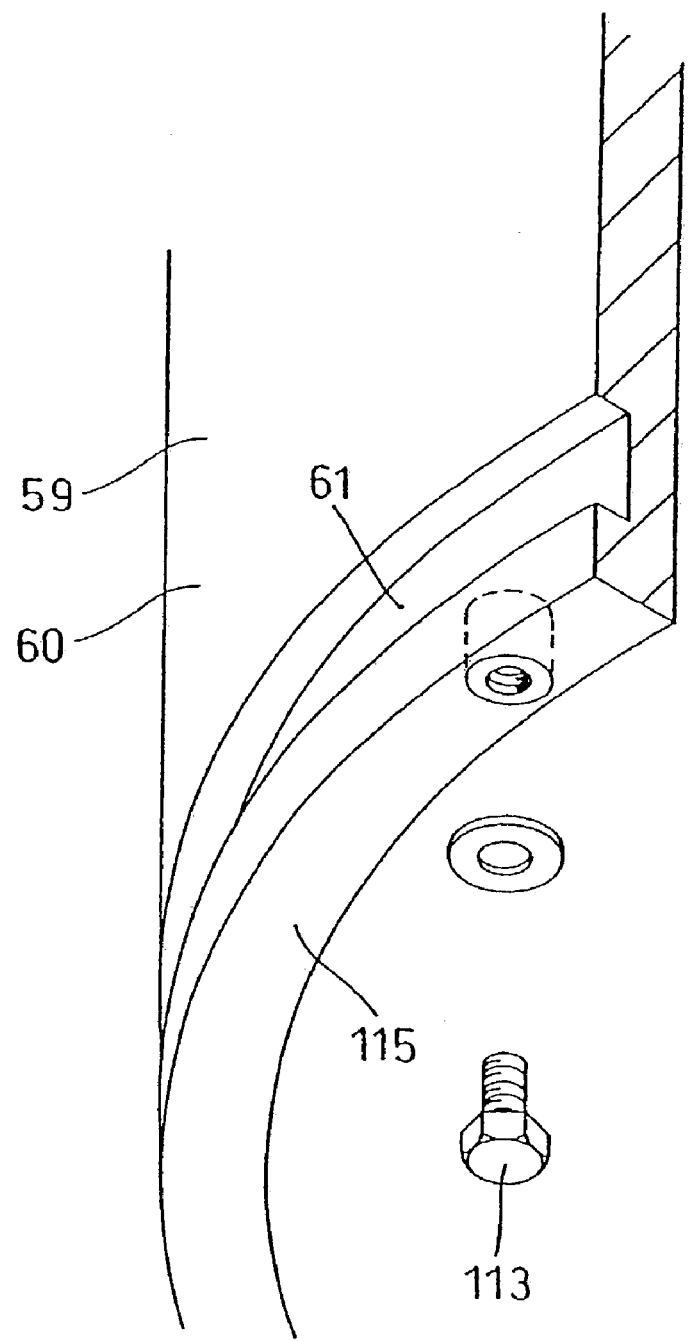
FIG. 11 is an enlarged perspective view of the lower end of the treatment materials container.
Figure 12:
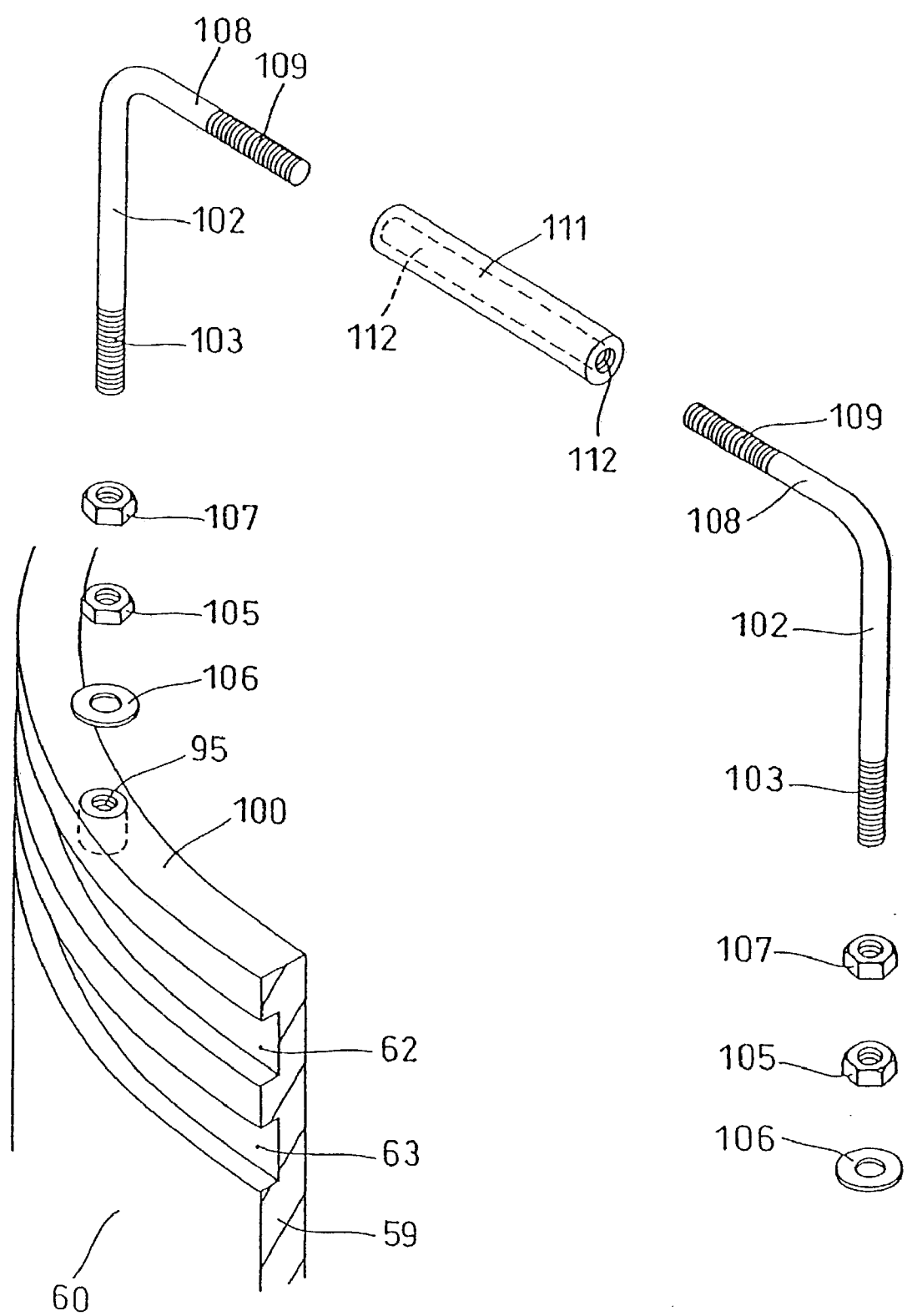
FIG. 12 is a perspective view of the upper portion of the treatment tank showing each member.

As shown in FIG. 11, at a lower end of the container 59, there is provided a continuous recess 61 therearound and as shown in FIG. 12, two continuous recesses 62, 63 around its top portion.

Figure 13:
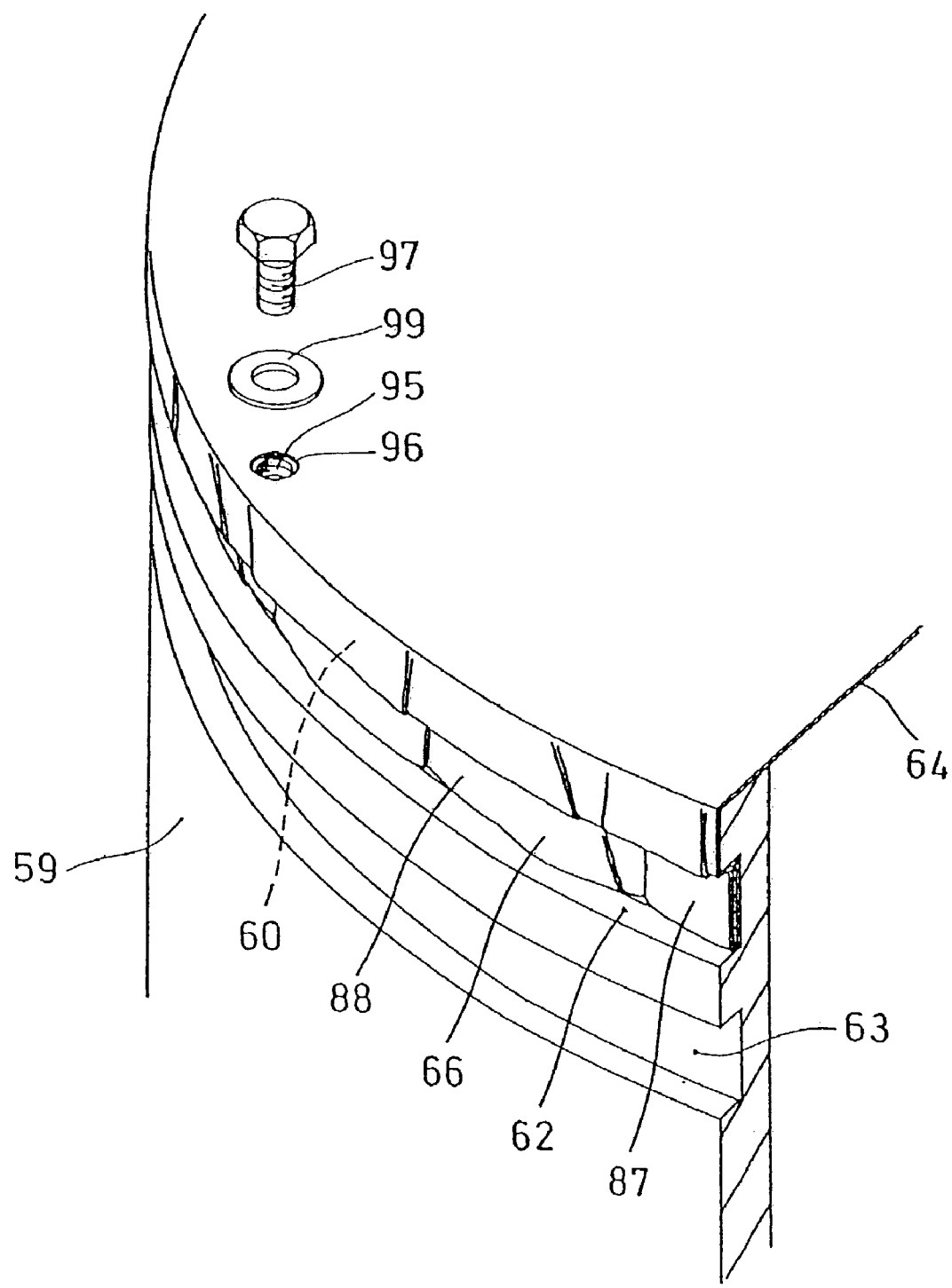
FIG. 13 is a perspective view of the treatment tank indicating the installment of a mesh cloth.
Figure 14:
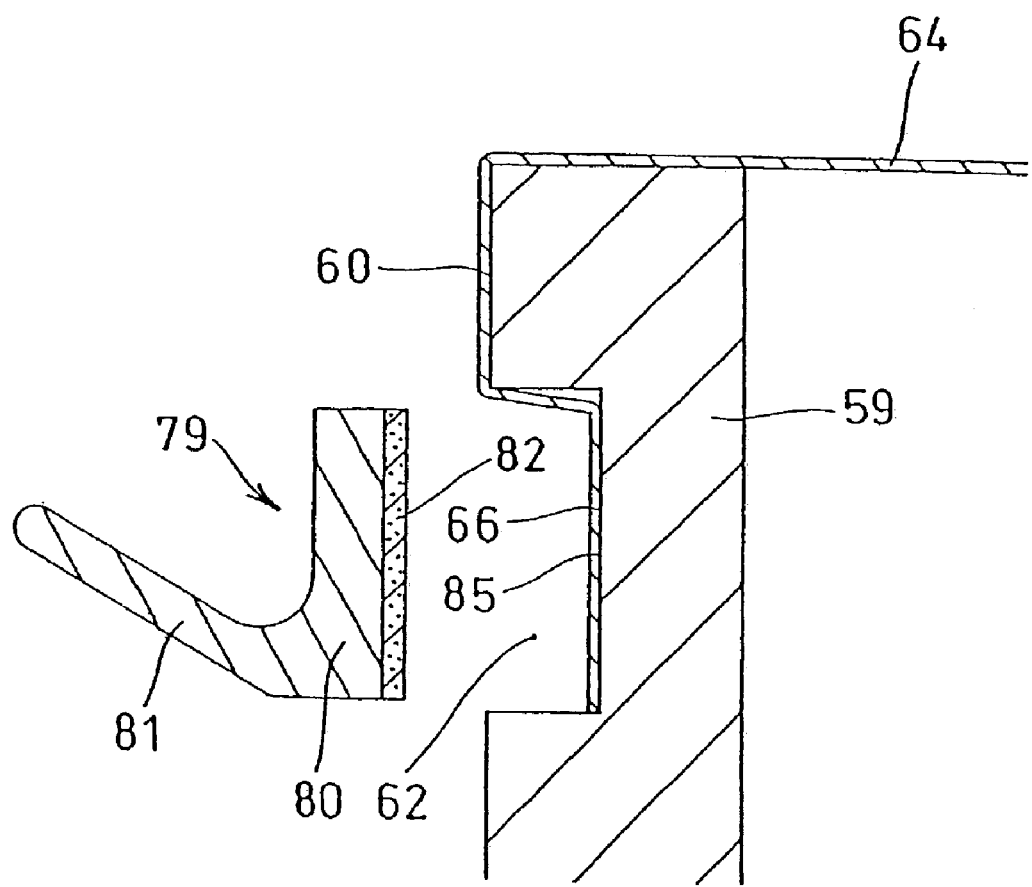
FIG. 14 is a cross-sectional view of an annular elastic sealing.
Figure 15:
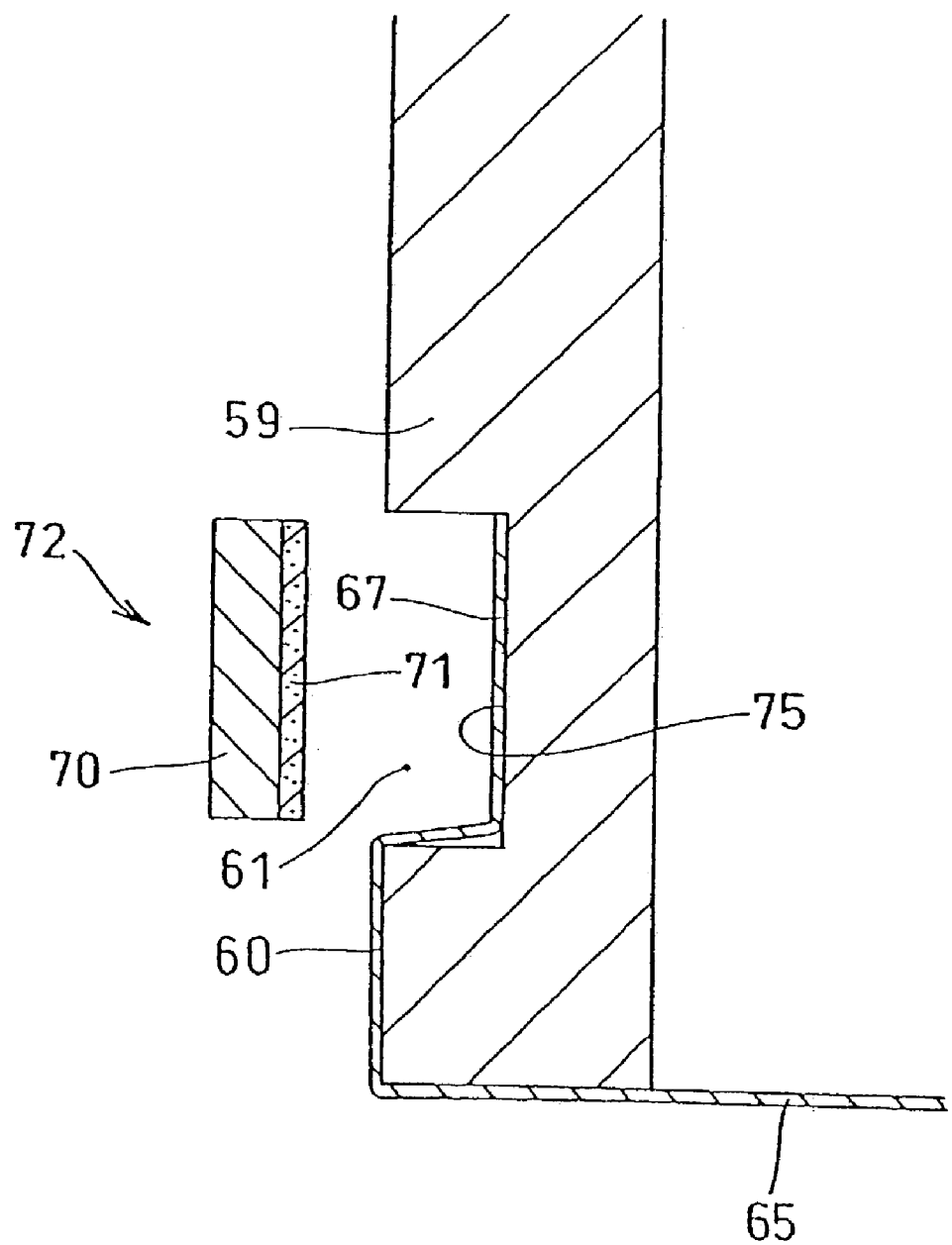
FIG. 15 is a perspective view of a recess round the lower end of the treatment tank.

As shown in FIG. 13, FIG. 14 and FIG. 15, both ends of the container 59 are covered with round mesh cloths 64, 65, made of a synthetic fiber such as polyethylene, or a metal fiber, and whose edges 66, 67 are folded to wrap the ends of the container 59 and fixed with stainless bands 68, 69 which are placed inside the recesses. The lower fixing band 69 installed in the lower recess 61 is permanently fixed but the upper fixing bands 68 are untied for washing the treatment materials 57 inside the container 59.

Figure 19:
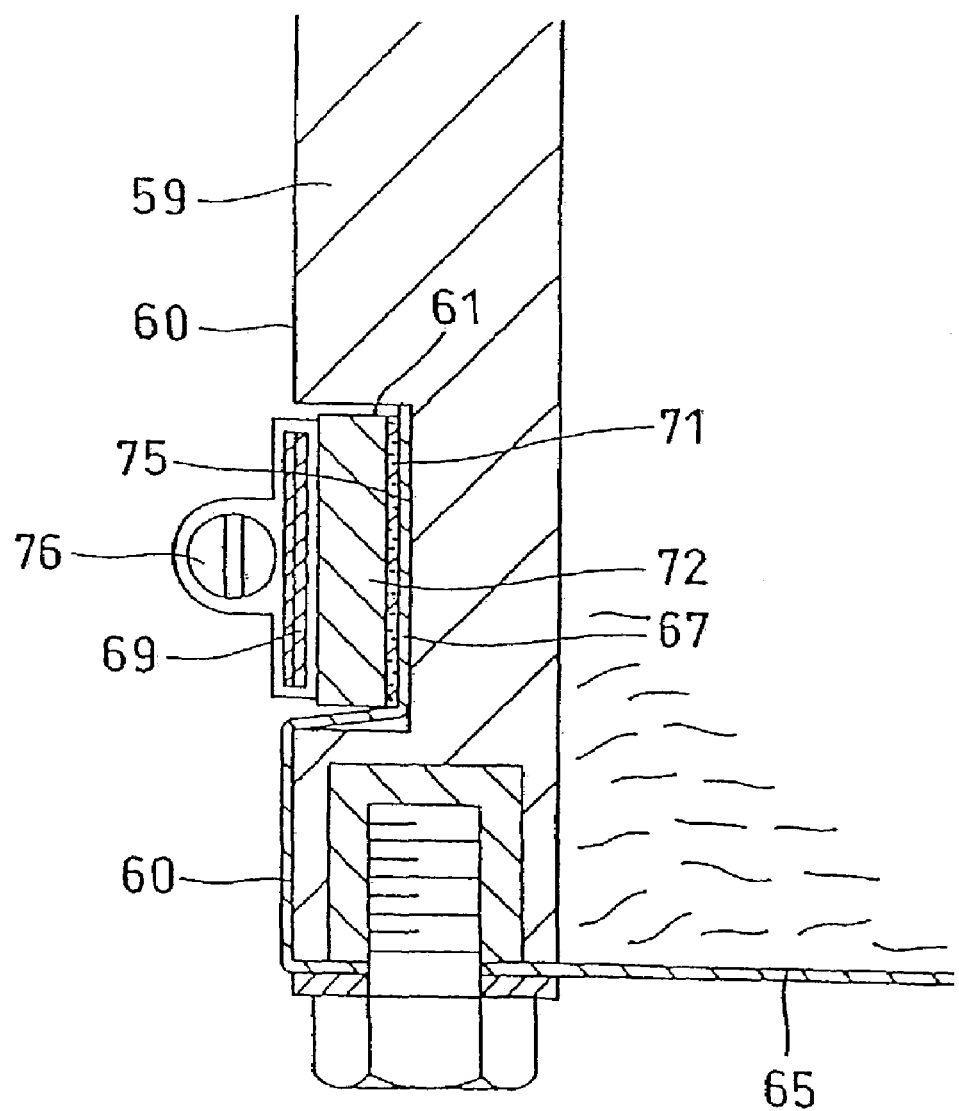
FIG. 19 is a cross-sectional view of the treatment materials container.
Figure 20:
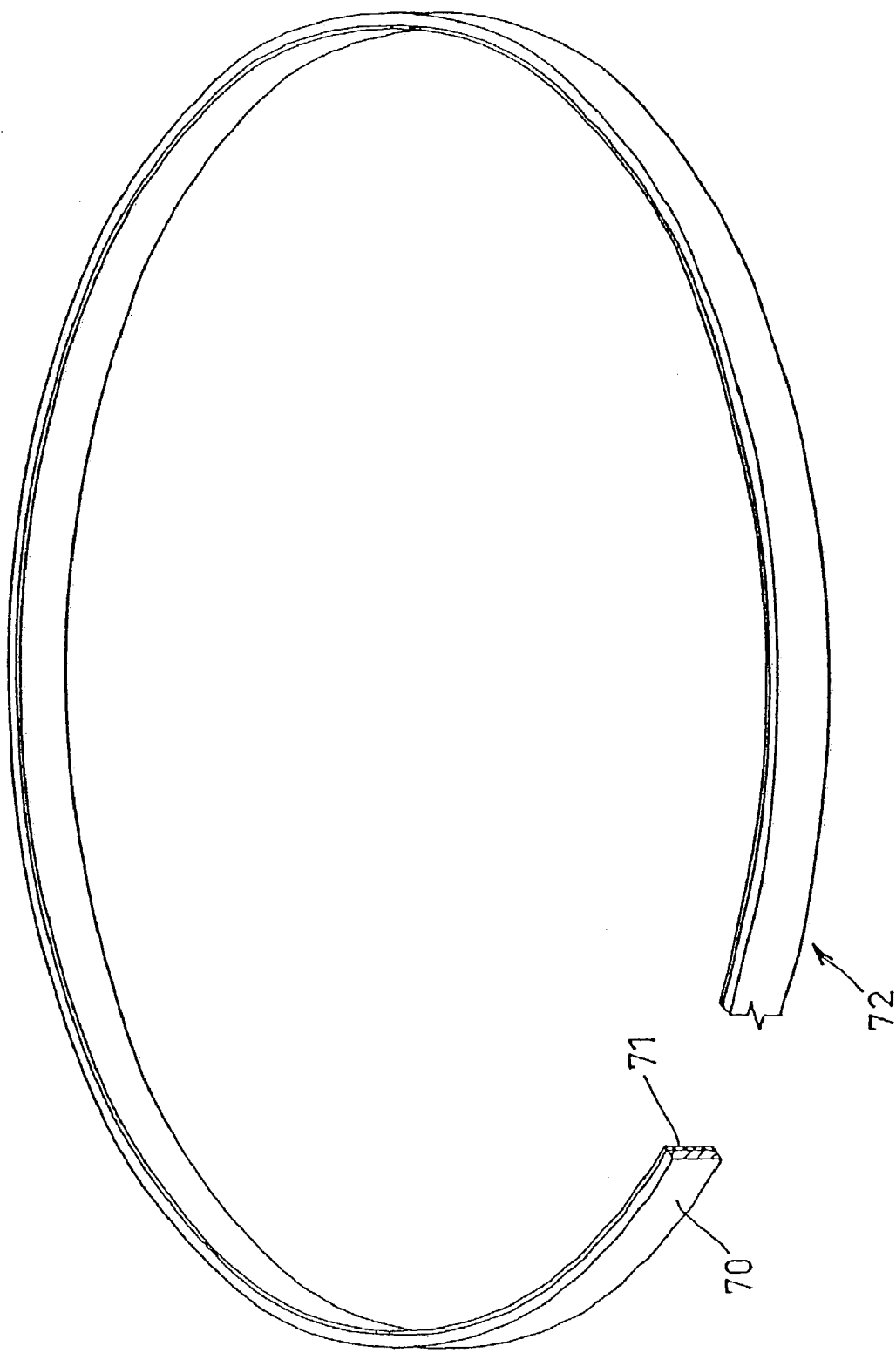
FIG. 20 is a perspective view of an annular elastic band.

As illustrated in FIG. 15, FIG. 19, and FIG. 20, the fixing band 69 is installed in the recess by placing an annular elastic band member 72 comprising a base member made of hard rubber and a foam rubber cushion 71.

Figure 21:
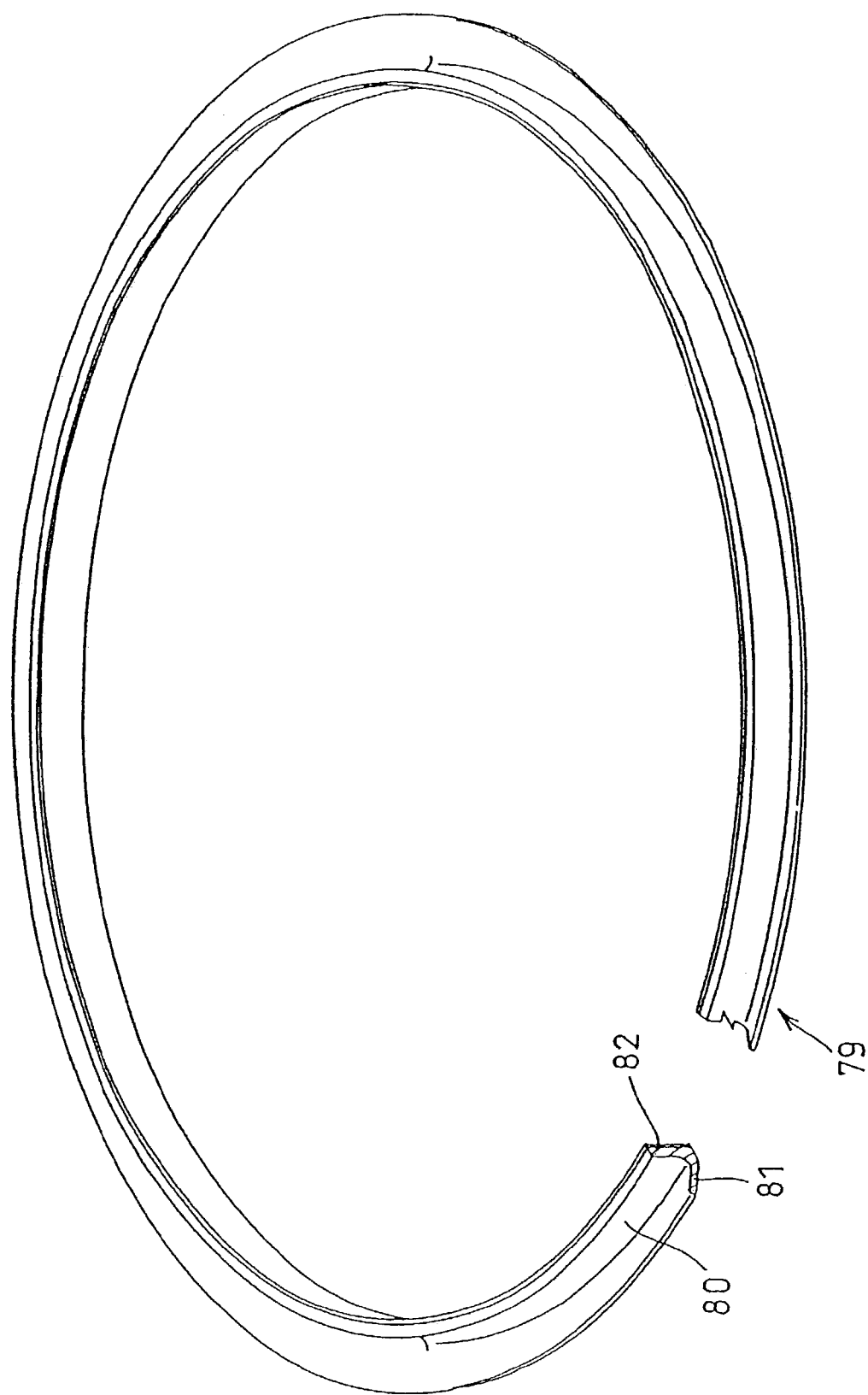
FIG. 21 is a perspective view of an annular elastic sealing.

As illustrated in FIG. 19, the edge 67 of the mesh cloth 65 is fixed by expanding the annular elastic band 72 for placing the band into the recess 61, suppressing the edge 67 by the band 72, placing the fixing band 69, and fastening the band by screwing the fastening screw 76. In the upper recess 62, an annular elastic sealing band 79 is installed under the fixing band 68 placed in the upper recess 62. As illustrated in FIG. 14 and FIG. 21, the annular elastic sealing band 79 has an upwardly projecting tongue 81 at the fixing portion 80 and a sponge rubber 82 underneath the elastic band 79.

As illustrated in FIG. 13 and FIG. 14, installing the mesh cloth 64 at the top of the container 59 involves placing the mesh cloth 64 on the top, extending the cloth edge over the recess 62, then expanding the annular sealing elastic band 79 for placing into the recess 62, and thereby suppressing the cloth edge 66 to the bottom 85 of the recess 62. The elastic annular sealing band 79 can hold the cloth edge 66 at its place, and the fixing band 68 is installed around the band for further securing and tightening by the tightening screw 68.

The sponge rubber 82 is pressed by tightening the fixing band 68, the mesh cloth 64 is secured stoutly and stable.

The cloth edge 66 inside the recess 62 is overlapped and consequently the edge is not flat and there is formed some unevenness 87, 88, but the mesh cloth is tightly secured because the sponge rubber 82 absorbs the unevenness and presses the cloth edge uniformly. The lower mesh cloth edge is also tightly secured by the sponge rubber cushion.

Figure 22:
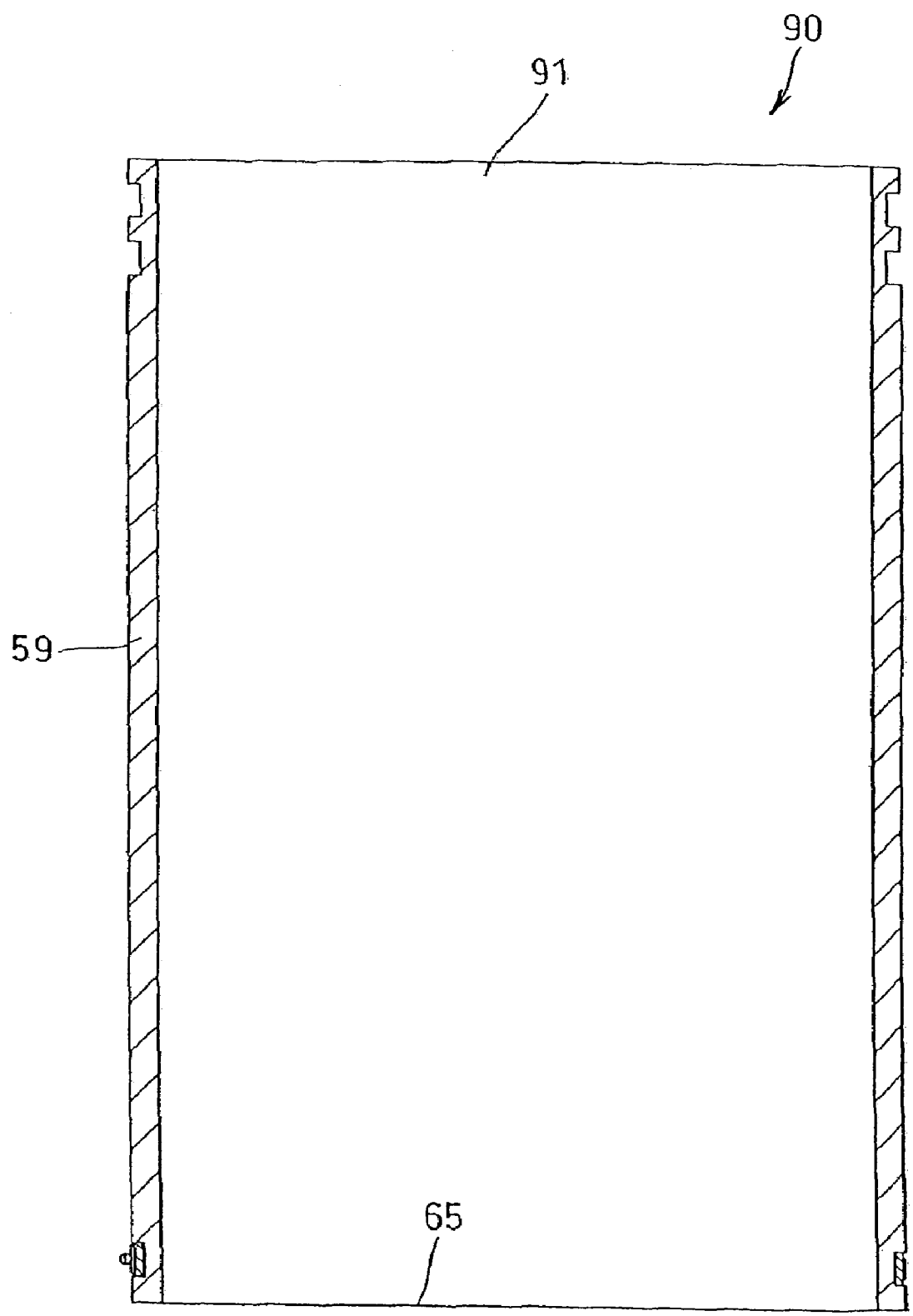
FIG. 22 is a cross-sectional view of the treatment materials container in which the mesh cloth is installed.

As shown in FIG. 22, the treatment materials 57 are filled in the container 59, whose bottom is closed with the mesh cloth 65, and the top of the container is also closed with the mesh cloth 64. If the diameter of the mesh cloth is large enough to reach the second upper recess 63, another fixing band is installed in the recess 63 for holding the cloth 64.

It is easy to install the fixing bands in the recesses because the recesses are provided outside of the container 59 and there is provided two recesses for holding the upper mesh cloth, the mesh cloth is strongly secured.

Figure 16:
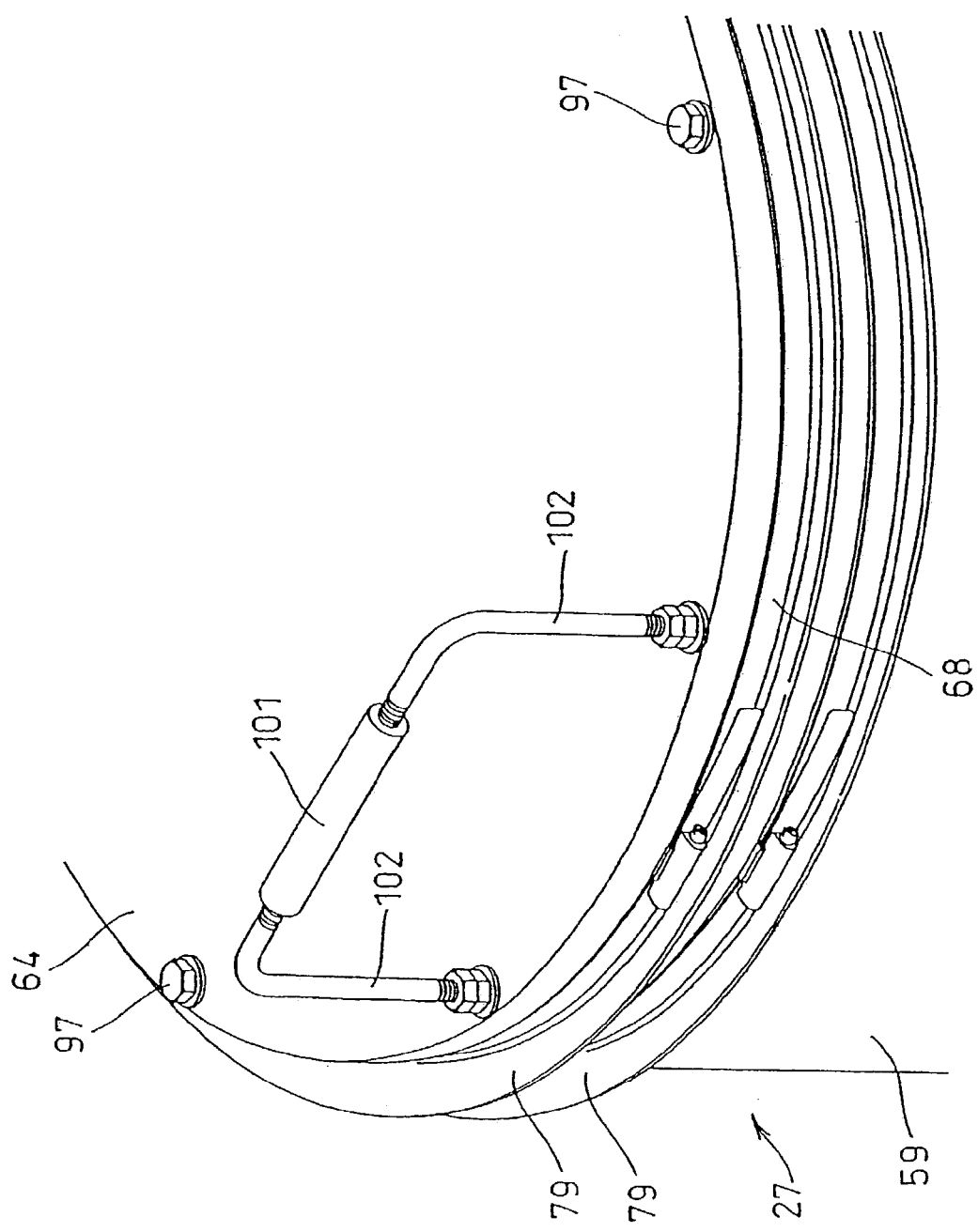
FIG. 16 is a perspective view of an upper portion of the treatment materials container.
Figure 17:
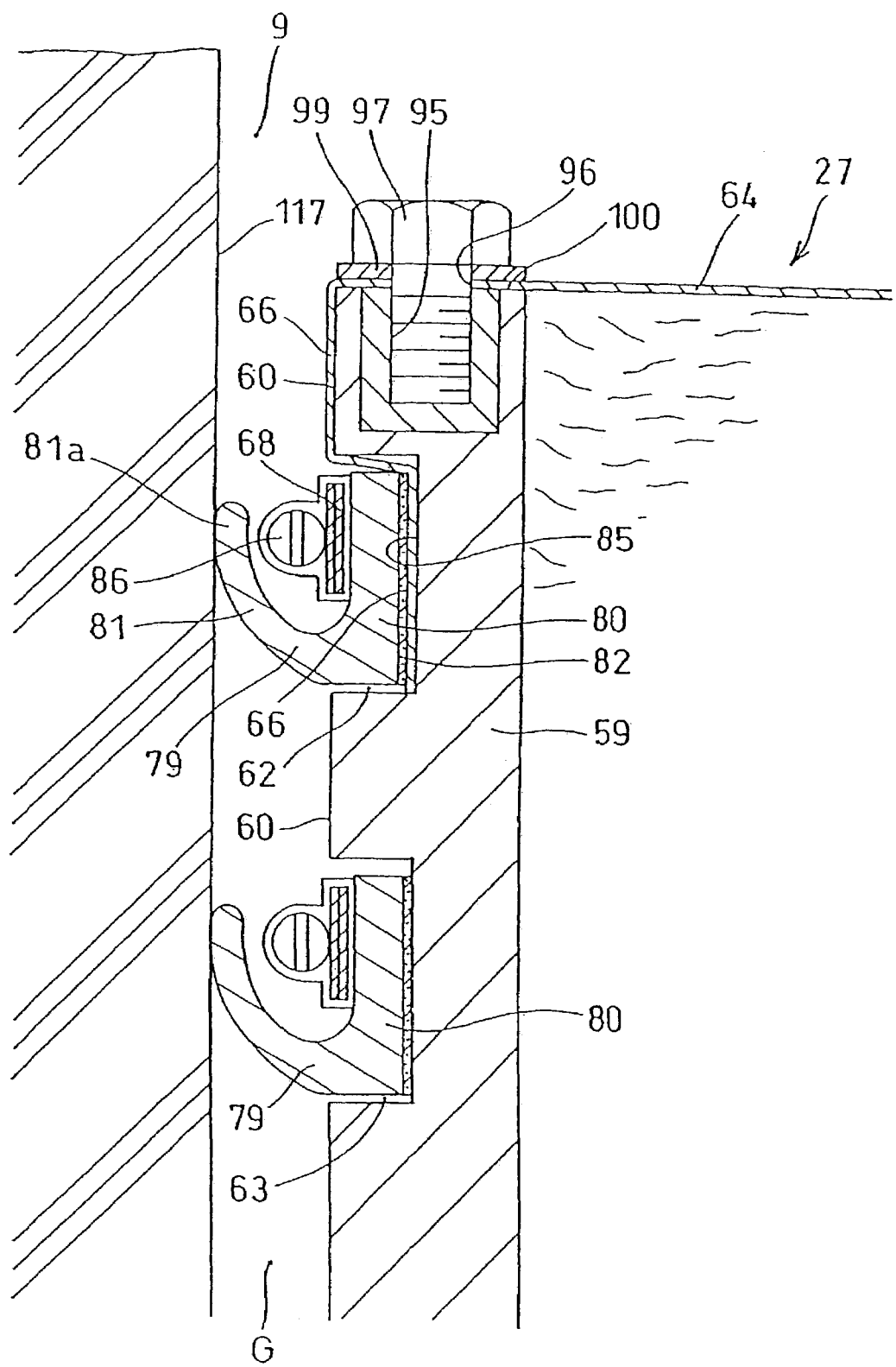
FIG. 17 is a cross-sectional view of the annular elastic sealing installed in the recess.
Figure 23:
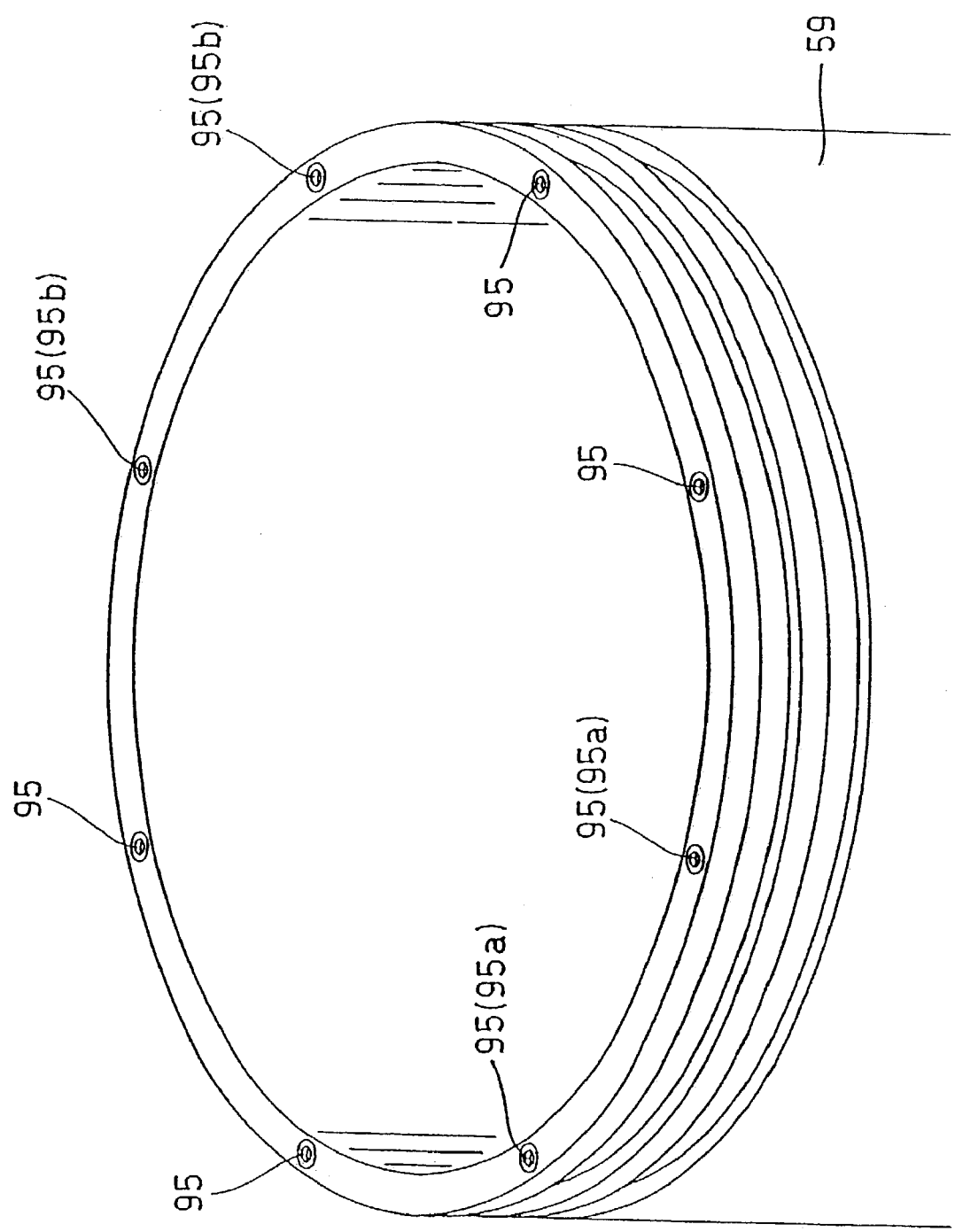
FIG. 23 is a perspective view of an upper portion of the treatment materials container.
Figure 24:
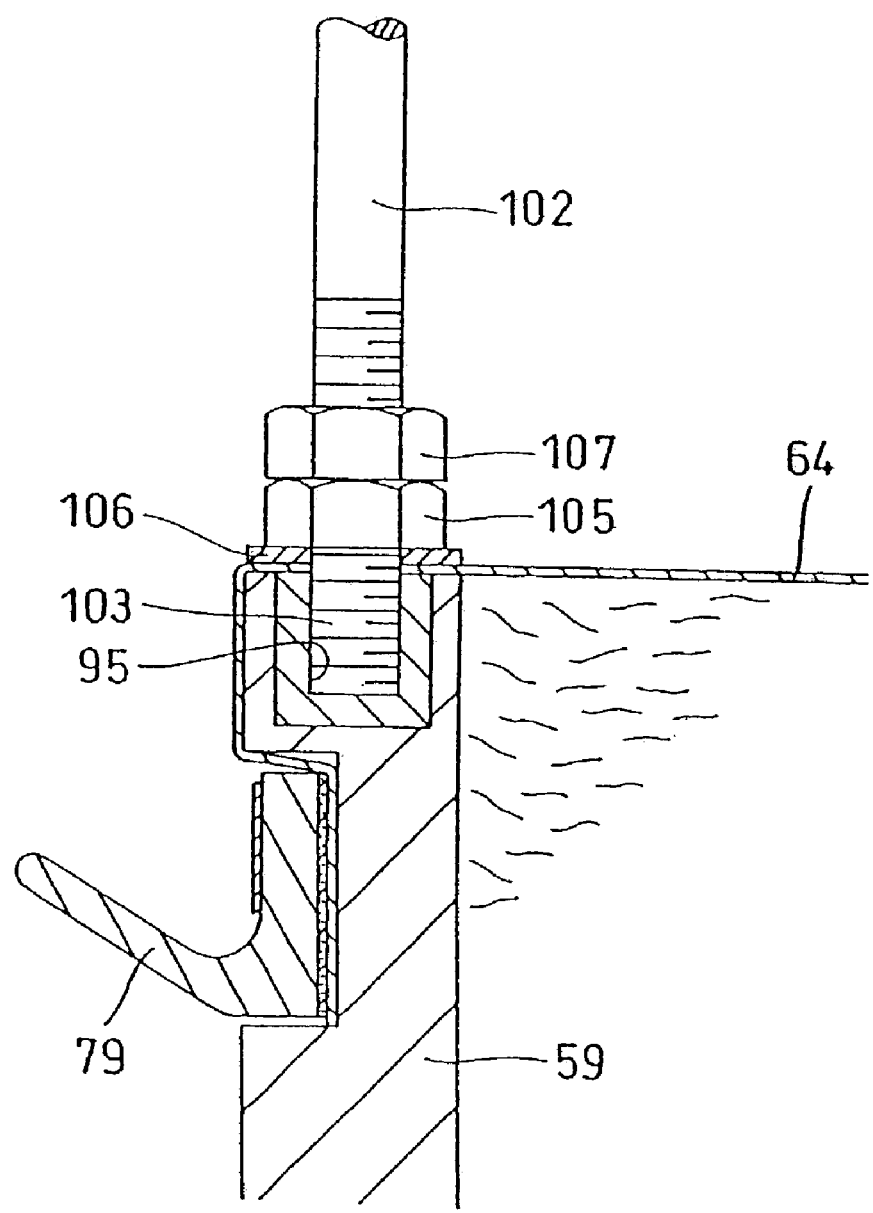
FIG. 24 is a cross-sectional view of a handle of the treatment materials container.
Figure 25:
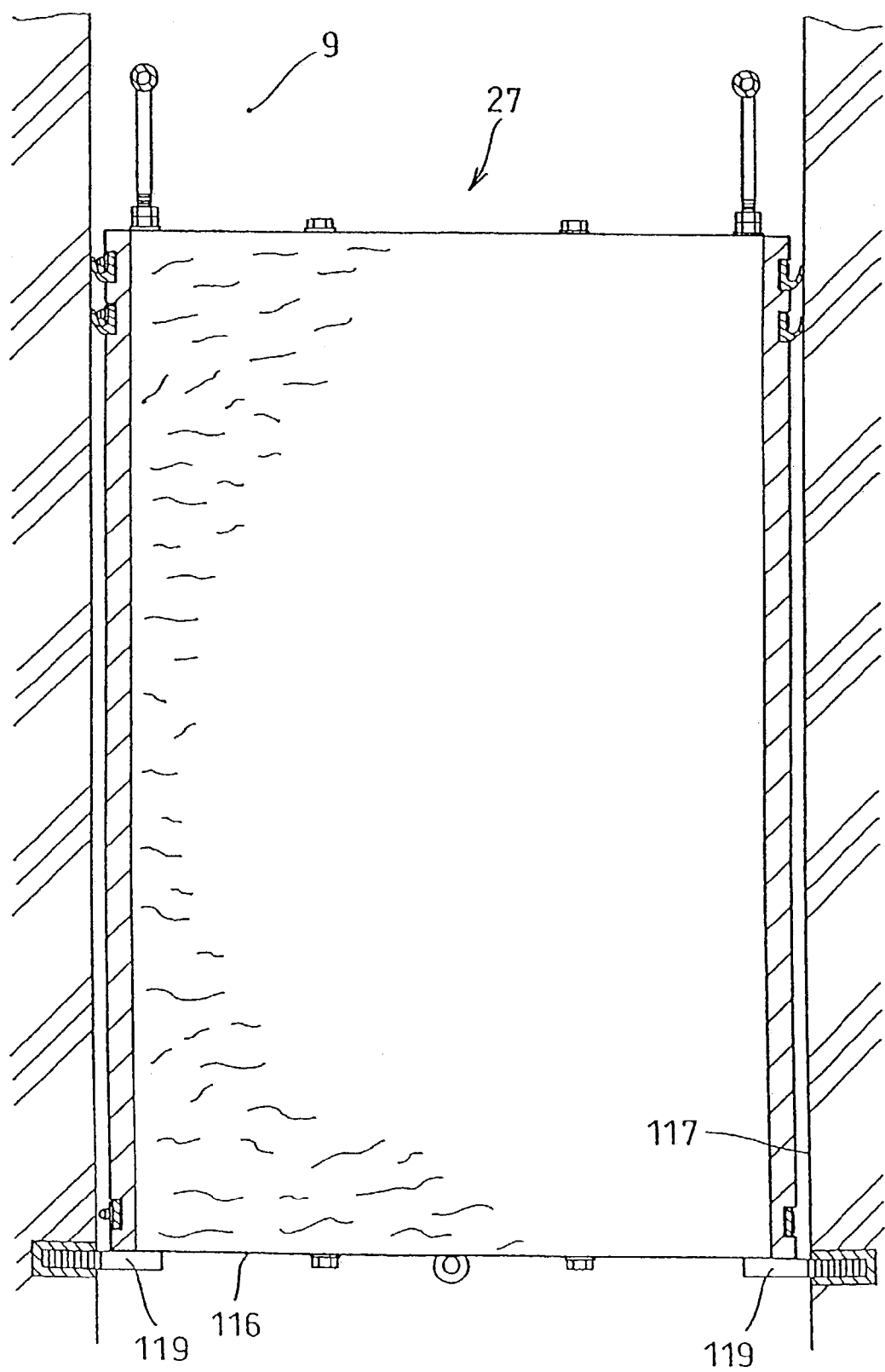
FIG. 25 is a cross-sectional view of the treatment materials container installed in the treatment tank.

There is provided screwed holes 95 at a certain distance at the top of the container 59 as shown in FIG. 12, FIG. 17 and FIG. 23, and there is provided holes 96 around the edge of the mesh cloth 64 corresponding to the screwed holes 95 for securing the mesh cloth 64 with bolts 97 more stoutly as shown in FIG. 13 and FIG. 17. As shown in FIG. 10 and FIG. 16, a handle 101 comprising L-shaped bars 102 having a screw at its both ends are connected in the female screws 95 as shown in FIG. 24, and tightened with nuts 105. The mesh cloth 64 is strongly fixed to the top of the container 59. A nut 107 is a counter nut for preventing loosening of the nut 105.

As shown in FIG. 12, there is provided screws 103, 109 at both ends of the L-shaped bar 102 and which is connected with a pipe 111 to form a handle 101.

Figure 18:
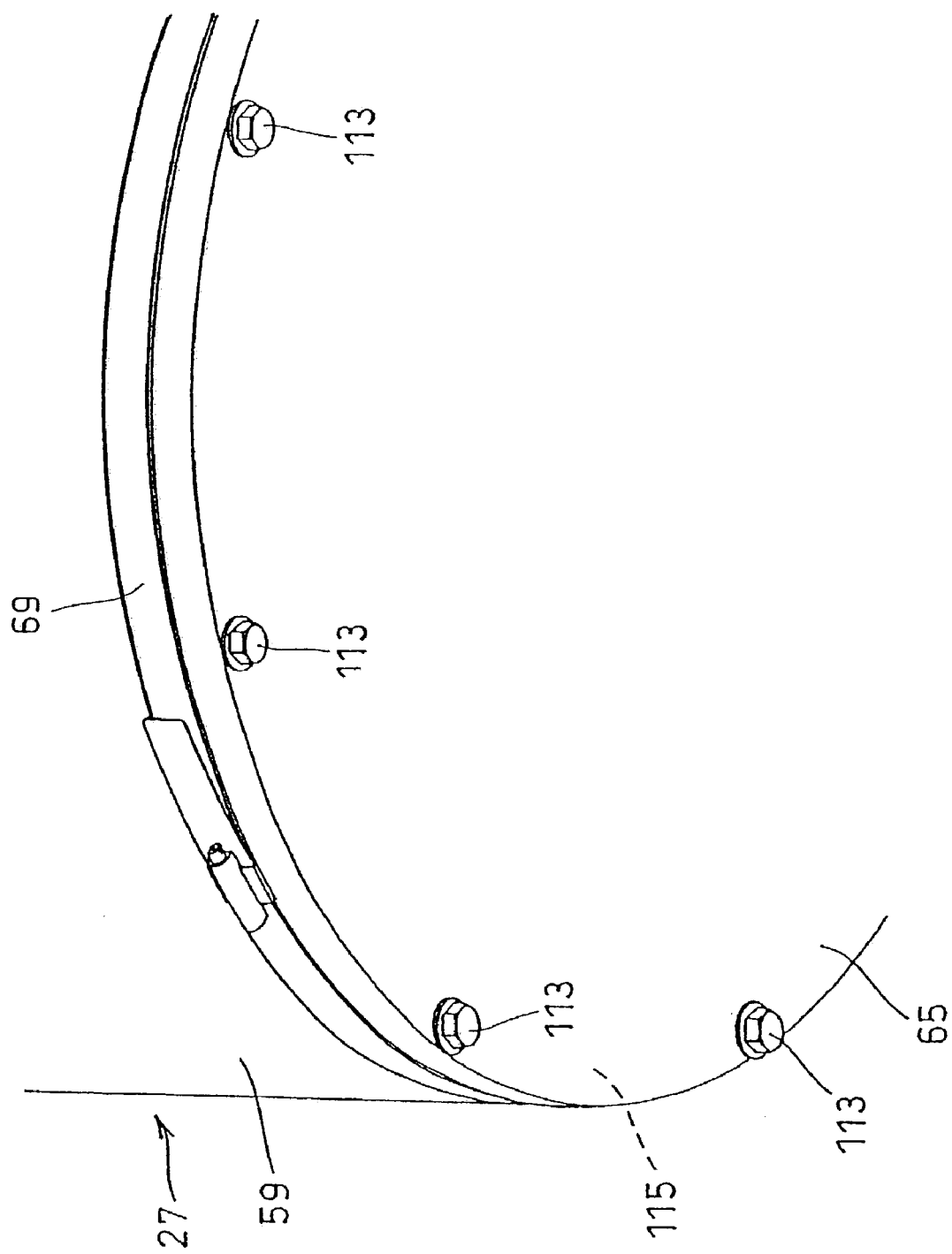
FIG. 18 is an enlarged perspective view of the lower end of the treatment materials container.

As shown in FIG. 18, lower mesh cloth 65 is also secured at the lower end of the container 59 with bolts 113 as the upper mesh cloth 64.

The diameter of the container 59 filled with the treatment materials is slightly smaller than that of the treatment tank 9, and the diameter of the annular elastic sealing band is slightly larger than that of the treatment tank 9. The container 59 is placed in the treatment tank 9 and supported on the four support members 119 disposed at the lower end of the treatment tank 9.

As illustrated in FIG. 17, the tongue 81a of the annular elastic sealing band seals the gap G between the inner wall of the treatment tank 9 and the outer wall of the container 59, the top of the tongue 81a abutting against the inner wall 117. As illustrated in FIG. 2, runoff water from the road surfaces flows down as the arrow indicates into the maintenance tank 7 through curb inlet 120, via inlet 30 and flows down through the opening 40. The maintenance tank 7 and the treatment tank 9 are connected to each other at their lower ends, the lower connecting conduit 33 is filled with the run-off water, then the water level in the treatment tank 9 gradually goes up and the water flows up between the treatment materials and exits from the exit outlet 31 consecutively.

The pollutants in the water are filtered or absorbed by the treatment materials 57 filled in the container 59.

The gap G between the container 59 and the treatment tank 9 is sealed with the annular elastic seal 79 and all the water is introduced into the treatment tank 9 through the mesh cloth 65. As the pollutants are almost removed while passing through the gaps between the treatment materials, purified water is discharged to the sewage pipe 56, through the upper mesh cloth 64, the outlet 31, the discharge box 53 and the discharge conduit 55.

The bottom level of the outlet 31 is designed to be lower than the bottom level of the inlet 30, so that the water flows automatically only by gravity. The level difference is designed considering the friction loss between the maintenance tank 7 and the treatment tank 9, including the conduit 33 and also the friction loss while passing through the treatment materials in the container 59.

The suspended solids, such as sand and mud larger than a mesh width of the lower mesh cloth 65, settles down at the bottom 25 of the treatment tank 25. A part of the filtered materials in the container 59 also precipitates at the bottom 25. The sediment 121 at the bottom may contain pollutants. The bottom of the treatment tank 9 declines toward the maintenance tank 7, consequently, the sediment 121 move to the maintenance tank 7 by gravity and accumulate at the bottom of the maintenance tank 7.

The pollutants accumulated on the road surfaces are washed away by rainfall, for instance, in the case of 8-10 mm per hour rainfall, most of the pollutants are washed away within 30 minutes. Then the runoff water containing pollutants flows in the maintenance tank 7 and is purified in the treatment tank 9. After this period, even if the rainfall continues, the amount of pollutants in the runoff water becomes very little or very low. Therefore, the runoff water treatment apparatus must be designed to accept all the initial amount of rainfall.

When the rainfall intensity is very high after the initial rainfall, the maintenance tank 7 is already full of water and it becomes impossible to accept more rainfall. The excess water floods from the maintenance tank 7 and flows over the top 118 of the cover plate 20 as the arrow in FIG. 3 indicates, and flows toward the outlet 31 directly by-passing the treatment tank 9. The by-passed water is not purified in the treatment tank 9, but most of the pollutants are washed away at the beginning of the rainfall. Therefore, the by-pass water contains few pollutants and does not pollute the environment.

If the capacity of the connecting conduit 33 is designed to be large enough to accept all the rainfall through the raining time, the cost of construction increases and requires a large area for installing. Therefore, it is preferable to design the capacity of the system only to accept the initial rainfall and to allow the excess rainfall to be discharged to the environment directly for reducing the cost.

When the cover plate 20 is closed, as illustrated in FIG. 6, the opening 17 of the maintenance tank 7 is closed, the rainfall from the road surface flows over the top 118 of the cover plate 20 (when the sealing of the cover plate is not perfect, a part of the runoff water flows into the maintenance tank 7), flows toward the outlet 31 and is directly discharged. So the water in the maintenance tank 7 is not agitated by the flow of the runoff water, the sediment at the bottom is not stirred and stays still.

The sediment at the bottom of the maintenance tank 7 must be removed and the maintenance tank 7 must be cleaned periodically. The amount of sediment is checked by opening the cover plate 20 and observing the sediment through the opening 17 (See FIG. 5) and the sediment is vacuumed through the opening 17. The sediment 121 at the bottom of the treatment tank 9 is also vacuumed. As the bottom of the treatment tank 9 declines toward the maintenance tank 7, it is easy for operation of the cleaning.

For cleaning the treatment materials or replacing the materials, the container 59 is pulled up from the treatment tank 9, and the handle 101 is removed from the container 59 by unscrewing the fixing nuts. The fixing band 68 and the upper annular elastic sealing band 79 are removed from the recess for removing the mesh cloth 64. The treatment materials 57 are washed and reused or fresh materials are refilled.

It is easy to pull up the container 59 out of the treatment tank 7 because the sealing tongue 81 of the annular elastic sealing band is disposed only at the top of the annular sealing band, the friction between the seal and the inner wall of the treatment tank 7 is rather small. The treatment materials are washed and cleaned in the treatment tank 7 by a water jet and allow the pollutants to flow down through the lower mesh cloth for another treatment.

Embodiment 2

Figure 26:
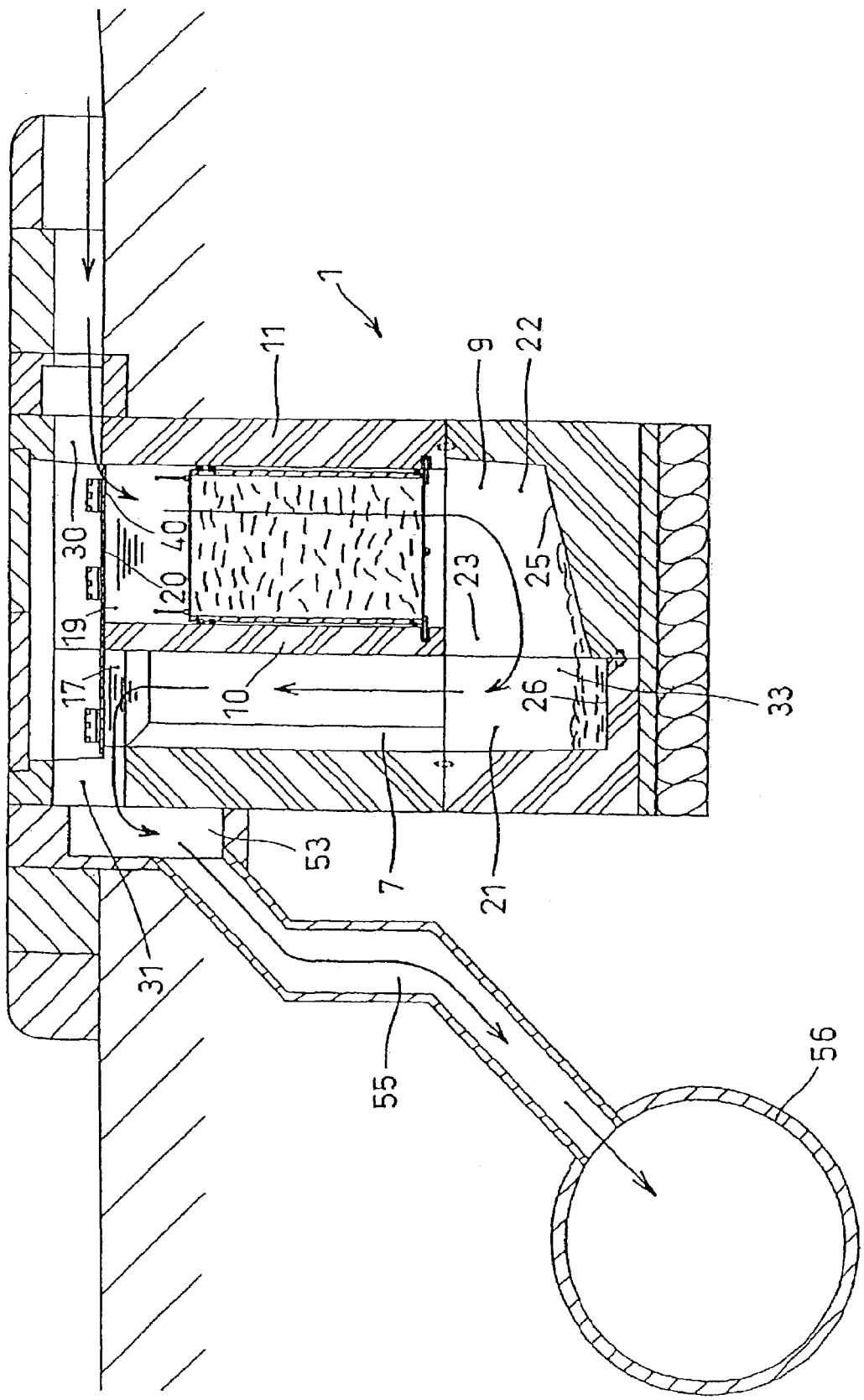
FIG. 26 is a cross-sectional view of another embodiment of the system.
Figure 28:
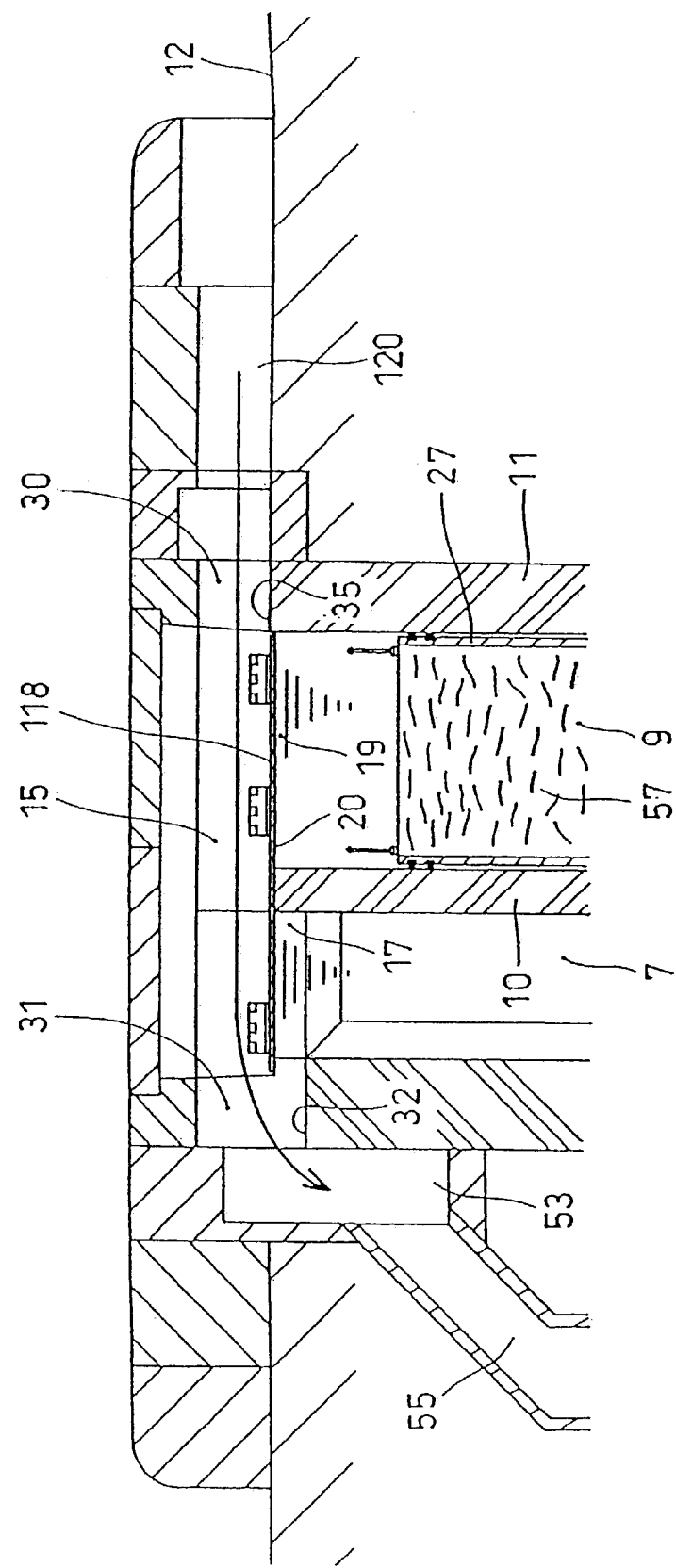
FIG. 28 is an enlarged cross-sectional view of the system illustrated in FIG. 26.

FIG. 26 and FIG. 28 show another embodiment of the invention of the water purification apparatus. It is basically the same as Embodiment 1. The water purification apparatus comprises a concrete block box 11, the inside of which is separated by a wall 10 and forms a maintenance tank 7 and treatment tank 9, both of which are connected to each other at their lower ends. Thereby, the drain water from the road surfaces flows into the maintenance tank 7 indicated by the arrows. The water flows downward in the treatment tank 9, then upward in the maintenance tank 7. The pollutants are removed by the water purification materials 57 in the treatment tank 9 and the purified water is discharged to a sewage pipe 56.

The bottom 25 of the treatment tank 9 is inclined toward the maintenance tank 7 and the treatment container 59 is detachably placed therein and both tanks are connected at their lower ends. A cover plate 20 is placed to cover the openings 19, 17 of both tanks. The difference from Embodiment 1 is the layout of the inlet 30 which is disposed at the treatment tank 9 and the outlet 31 is disposed at the maintenance tank 7. They are oppositely arranged as compared with Embodiment 1. The bottom 32 of the outlet 31 is lower than the bottom 35 of the inlet, thereby, the purified water in the treatment tank 9 flows out automatically by gravity.

Figure 27:
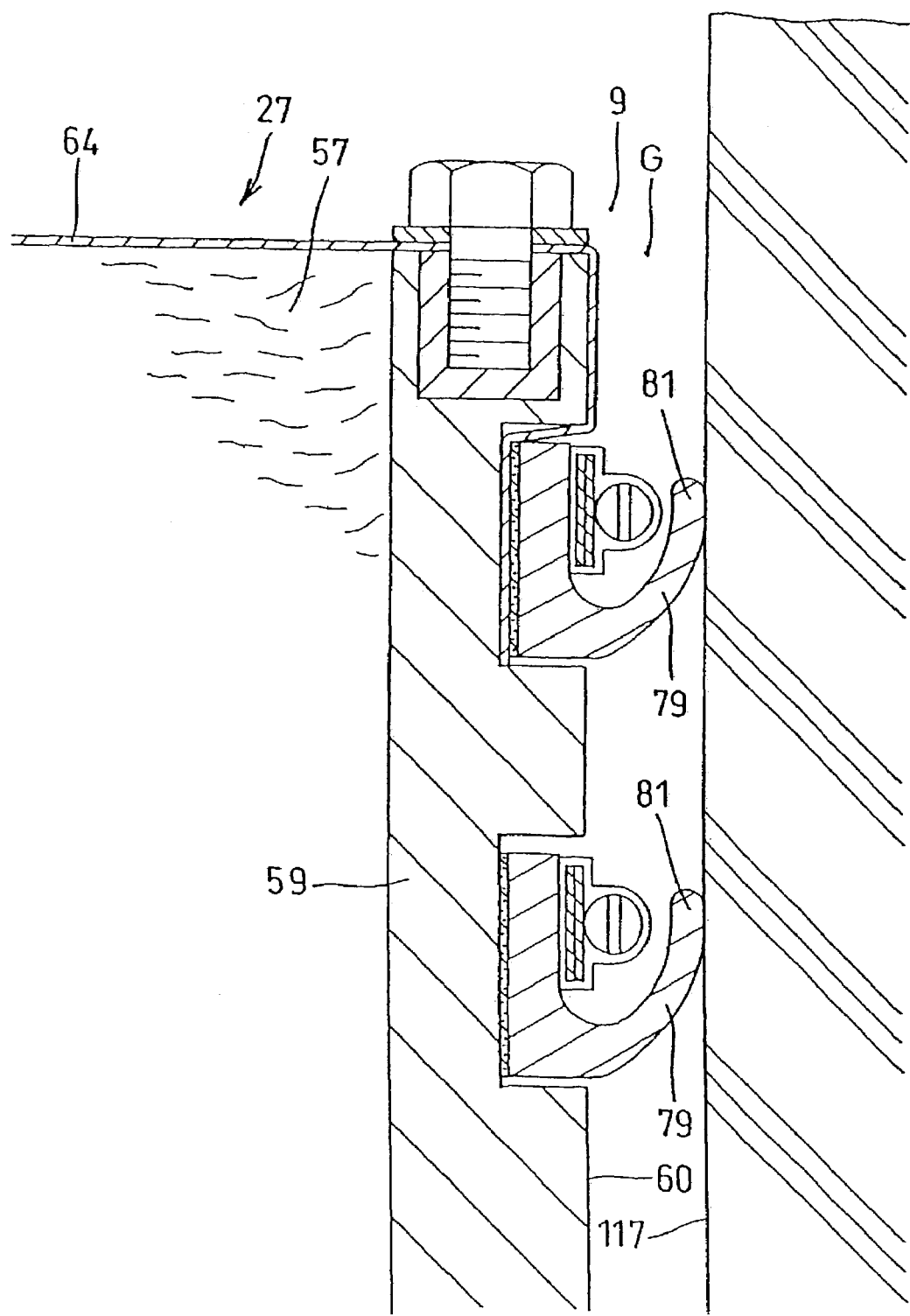
FIG. 27 is a cross-sectional view of the annular elastic sealing installed in the recess.

The runoff water, as indicated by the arrow in FIG. 26, flows down to the treatment tank 9 from an inlet 30 via the inlet 40 disposed at the cover plate 20. As illustrated in FIG. 27, the gap G between the treatment material container 59 and the treatment tank 9 is sealed with the annular elastic seal 79, all the downflow water from the inlet is introduced into the treatment tank 9 through the mesh cloth 65. As the pollutants are almost removed while passing through the gaps between the treatment materials, purified water is discharged to the sewage pipe 56, passing through the connecting conduit 23, the maintenance tank 7 and the outlet 31. If the treatment tank 9 becomes full of runoff water and cannot accept the extra runoff water, the excess runoff water, as illustrated in FIG. 28, bypasses the inlet 30, flows on the top 118 of the cover plate 20 and exits from the outlet 31.

Embodiment 3

Figure 29:
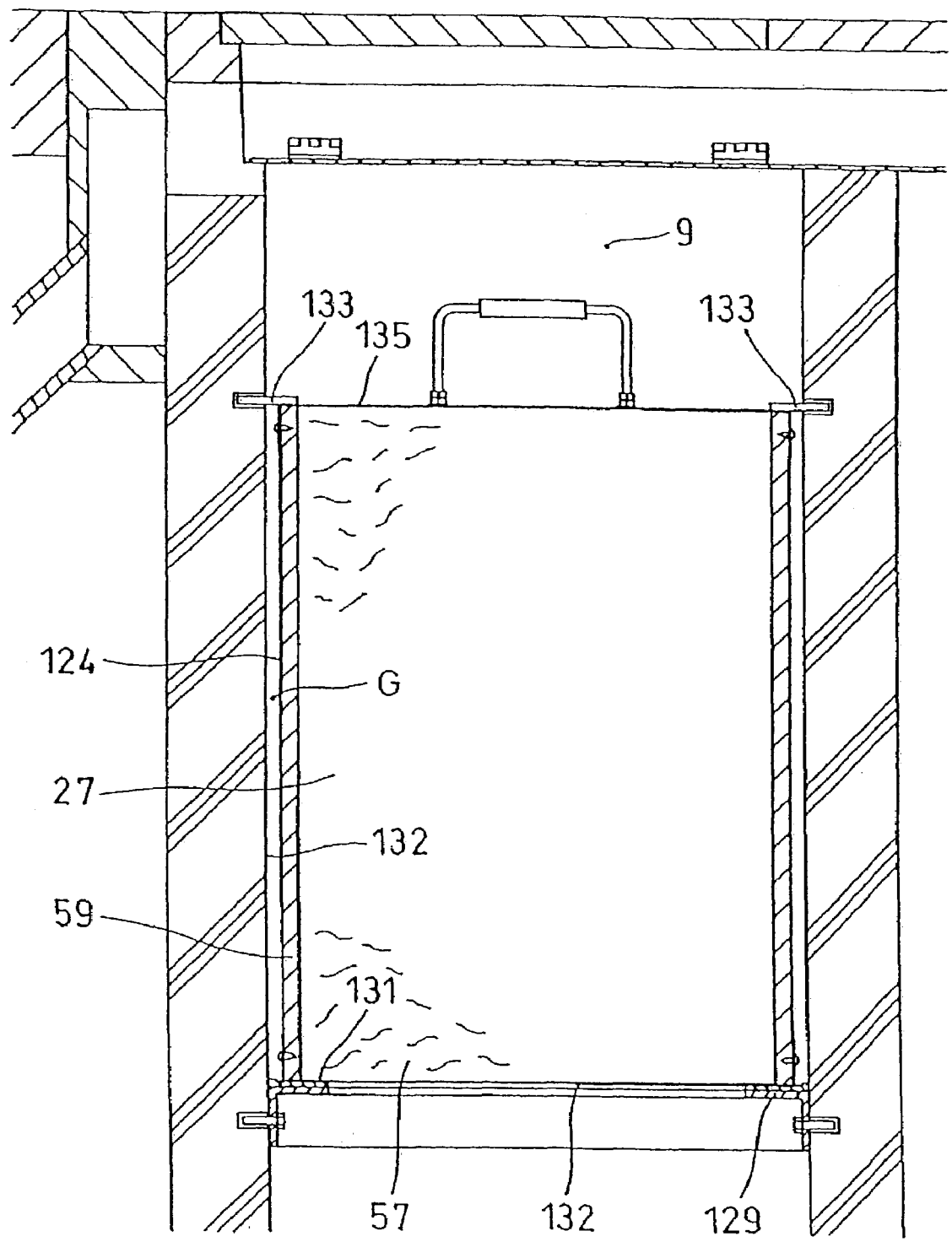
FIG. 29 is a cross-sectional view of another embodiment of the treatment materials container.
Figure 30:
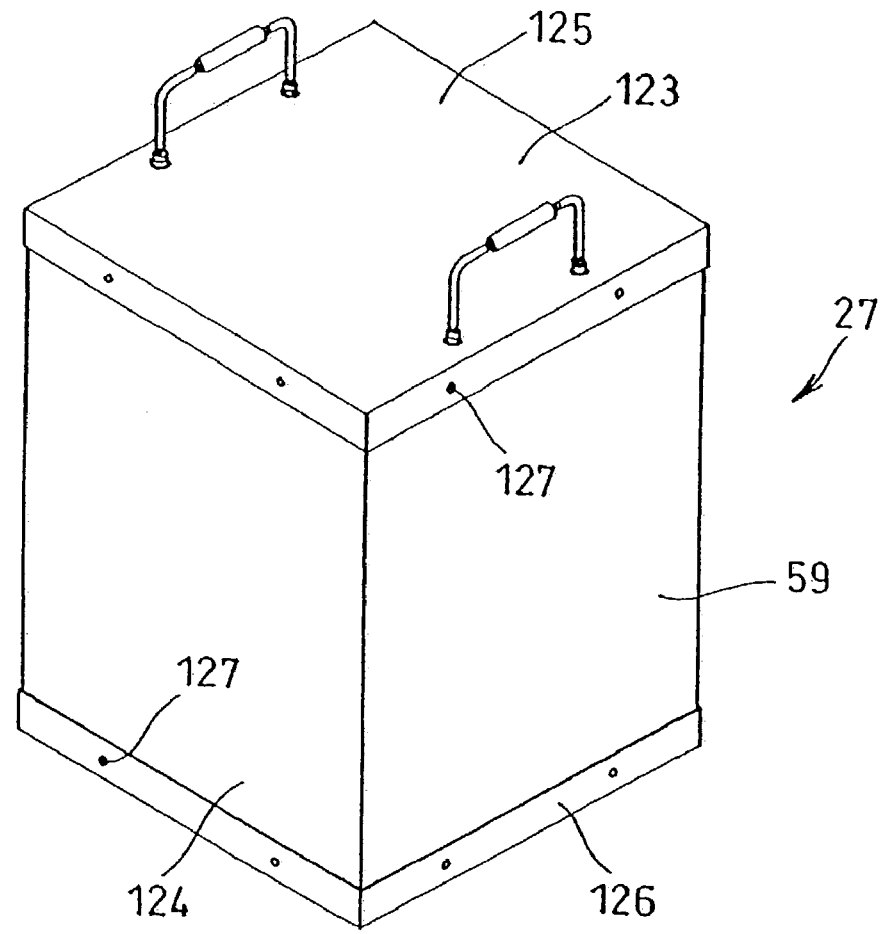
FIG. 30 is a perspective view of the treatment materials container and the treatment tank.
Figure 30:
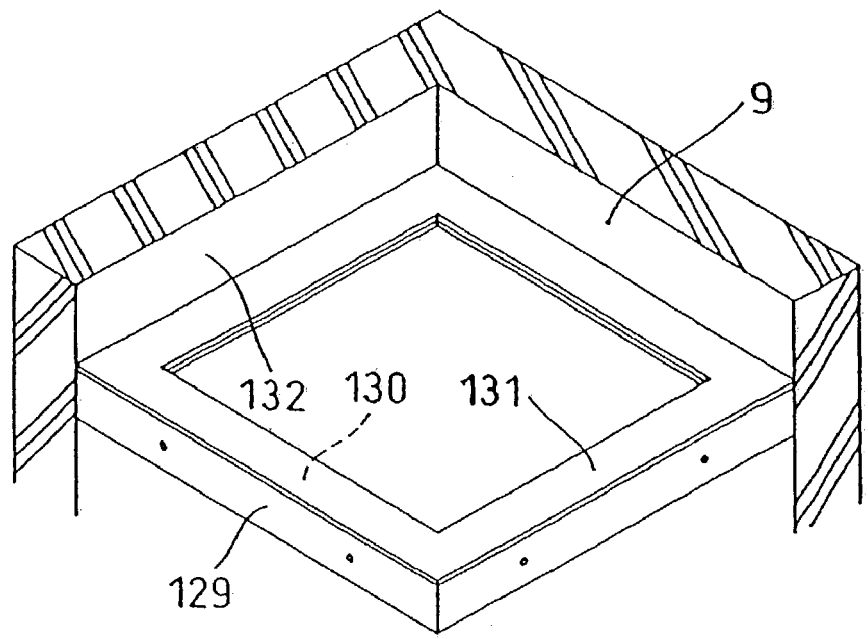
Figure 31:
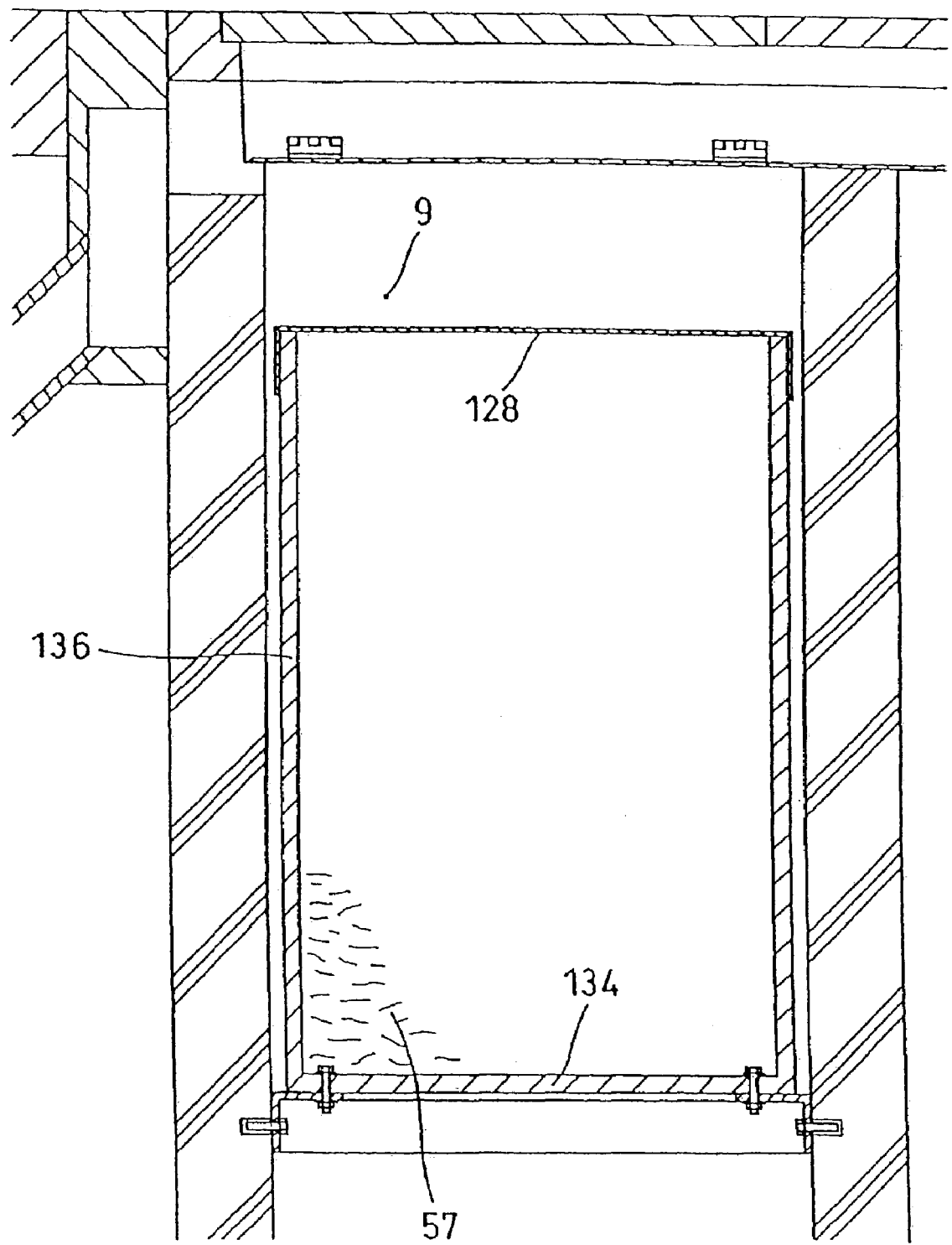
FIG. 31 is a cross-sectional view of the treatment tank and the treatment materials container.

FIG. 29 and FIG. 30 show another embodiment of the container 27 of the treatment materials. It is basically the same as Embodiment 1 and in a preferred embodiment, the cross-section of the container 59 is rectangular and both ends are covered by covers 125, 126, which comprise mesh cloth 123 and are secured to the container with bolts. The treatment tank 9 is preferably rectangular and extends vertically and there is provided support members 129 made of angle members at the inside lower end thereof and sealing members 131 are glued on the top of the support members 129.

The container 27 is placed inside the treatment tank 9 and the lower end is supported on the support members 129. The sealing members 131 are compressed by the weight of the container 59 so the gap G between the container 59 and the inside wall 132 of the treatment tank 9 is sealed. The runoff water flows into the container 59 through the inlet 30 and flows upward or downward and the water is purified while passing through the container and flows out from the outlet. When the container may float because of the buoyancy, the stoppers 133 disposed at the top of the container prevent the container from floating and keep the container at its position.

Embodiment 4

The container 136 is permanently fixed to the treatment tank 9 with bolts and the bottom of the container 136 is permeable through which the water can pass. The container is filled with the treatment materials 57 stored in the mesh bag. If the treatment materials float when the water is introduced into the container, the top of the container may be covered by a mesh cloth or the like for preventing an overflow.

Detail of the Embodiment

The container 27 may be assembled with the cylinder 59 having at least the bottom thereof passing water.

Instead of the handle 101, recesses may be disposed at the side of the container 59 for handling.

It is not necessary to use the continuous recess around the container for resting the fixing band for securing the mesh cloth to the outer edge of the container.

The sealing 79 may be placed around the lower end of the container 59. This is the case, for instance, when the annular band 72 placed into the lower recess 61 is replaced by the sealing 79.

As the annular elastic sealing 79 is used to seal the gap between the cylinder wall 60 and the inner wall 117 of the treatment tank, it is not necessary to place sealings at both ends of the container. One annular elastic sealing will do for sealing the gap.

The water in the container 27 may discharge from the sidewall of the container, since the primary object of the container is to remove the pollutants in the run-off water. The gap between the inside wall of the treatment tank 9 and the outside of the container, or allowing the entire run-off water to be in contact with the treatment materials, if the gap is small and the amount of water leakage is negligible, no sealing for the gap is necessary.

It is preferable that the cover 20 may close the opening 17 of the maintenance tank and the opening of the treatment tank independently by dividing the cover 20 into two.

Figure 32:
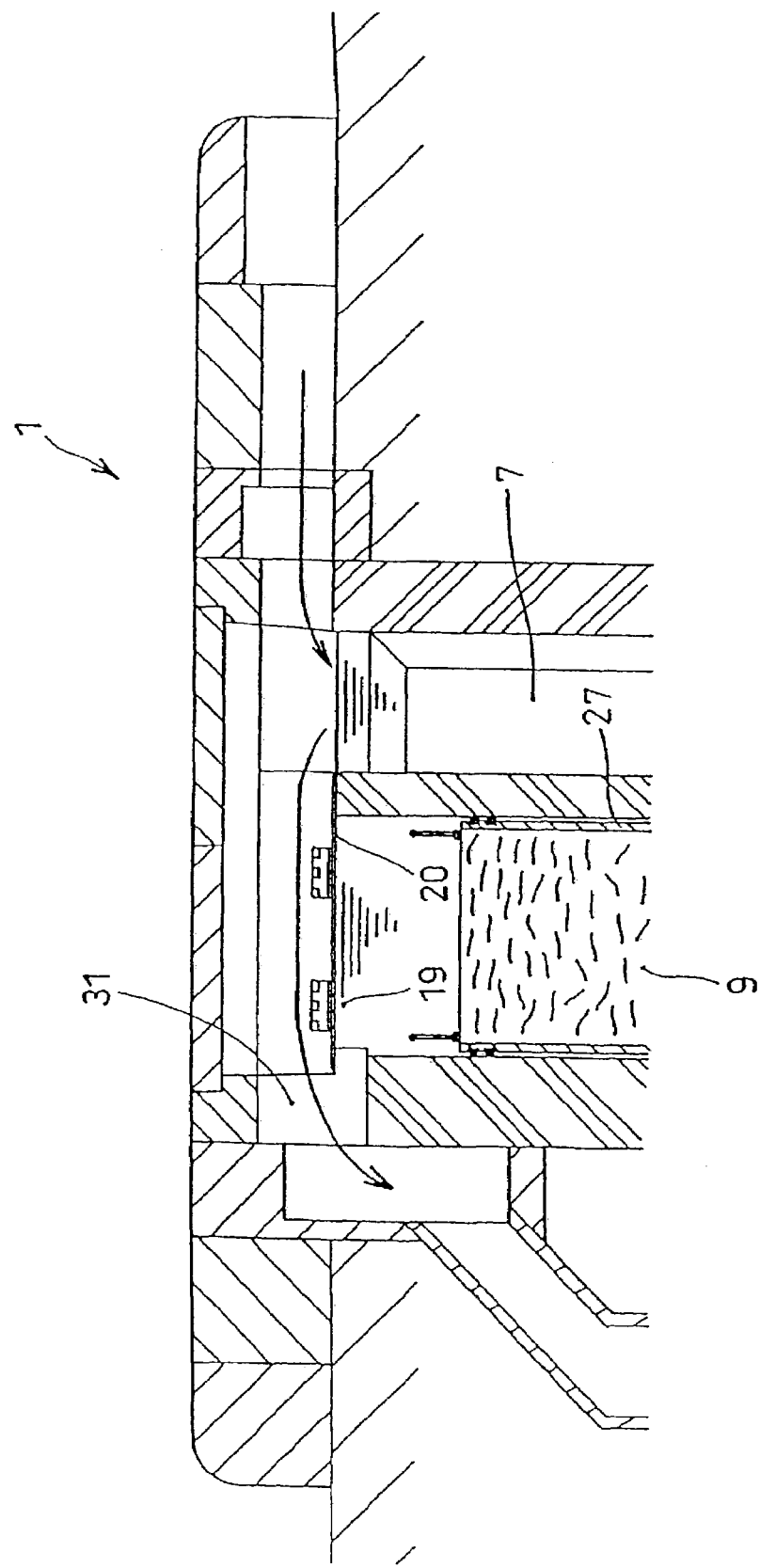
FIG. 32 is a cross-sectional view of the treatment tank showing the cover plate.

When the independent cover 20 is applied, as illustrated in FIG. 32, only the opening 19 of the treatment tank 9 may be opened and closed. When the maintenance tank 7 becomes full of runoff water, the excess runoff water flows on the cover plate 20 over the opening 19 and is directly discharged from the outlet 31 as the arrow indicates in FIG. 32.

Figure 33:
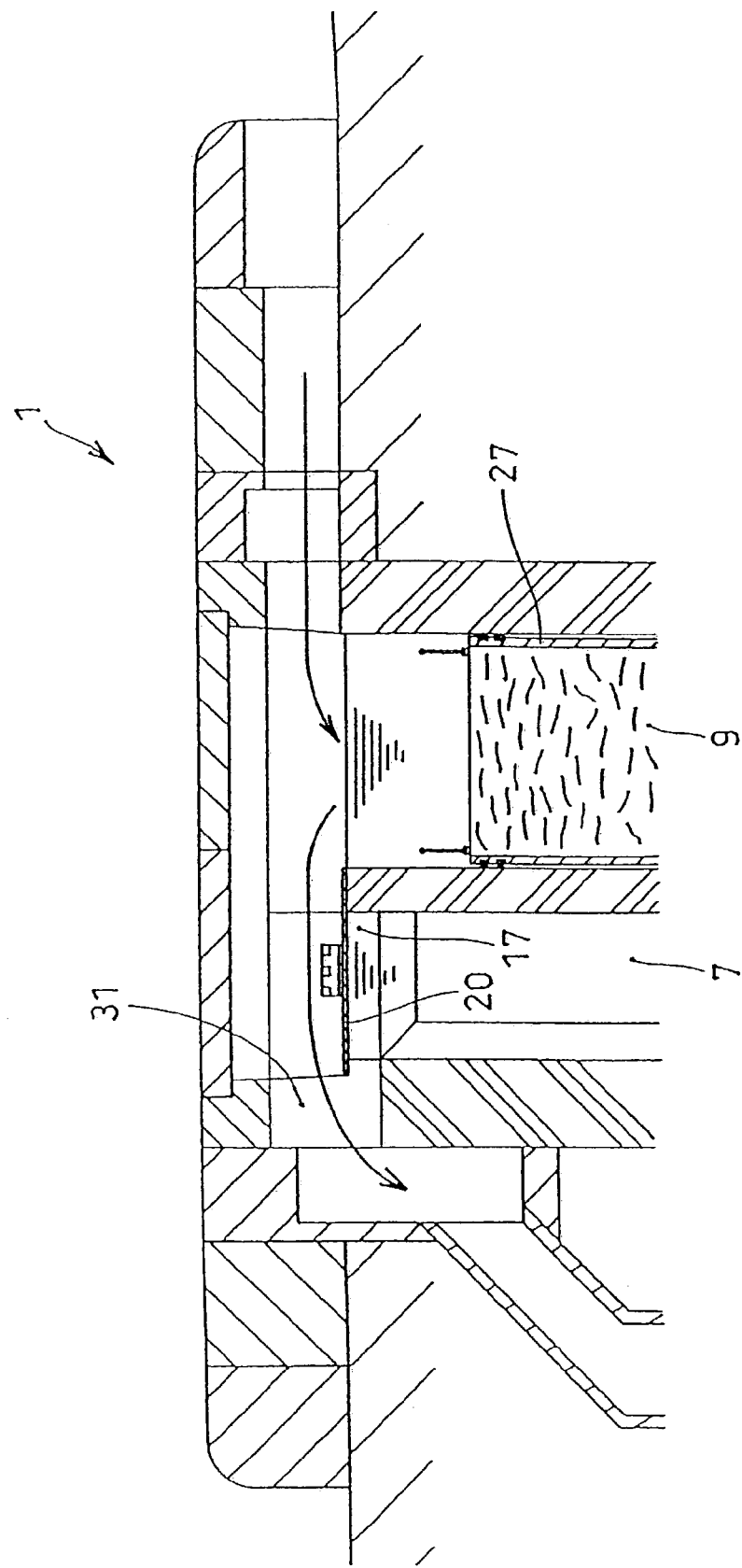
FIG. 33 is a cross-sectional view of the maintenance tank showing the cover plate.

When the runoff water flows directly into the treatment tank 9, as illustrated in FIG. 33, only the opening 17 of the maintenance tank 7 is closed with the cover plate 20 and when the treatment tank 9 becomes full of runoff water, the excess runoff water flows on the cover plate 20 over the opening 17 and is directly discharged from the outlet 31 as the arrow in FIG. 33 indicates.

When cleaning the maintenance tank 7, suction for removing the sediment at the bottom is not necessary if the maintenance tank 7 has an opening wide enough for cleaning. If all the sediment at the bottom of the maintenance tank 7 can be removed by vacuum suction cleaning, the bottom of the treatment tank 9 is not necessarily declined toward the maintenance tank 7.

FIG. 34, FIG. 35, and FIGS. 36-38 illustrate a runoff water purification unit for treating large volumes of runoff water and has a plurality of treatment tanks (for instance two) and a maintenance tank.

Figure 34:
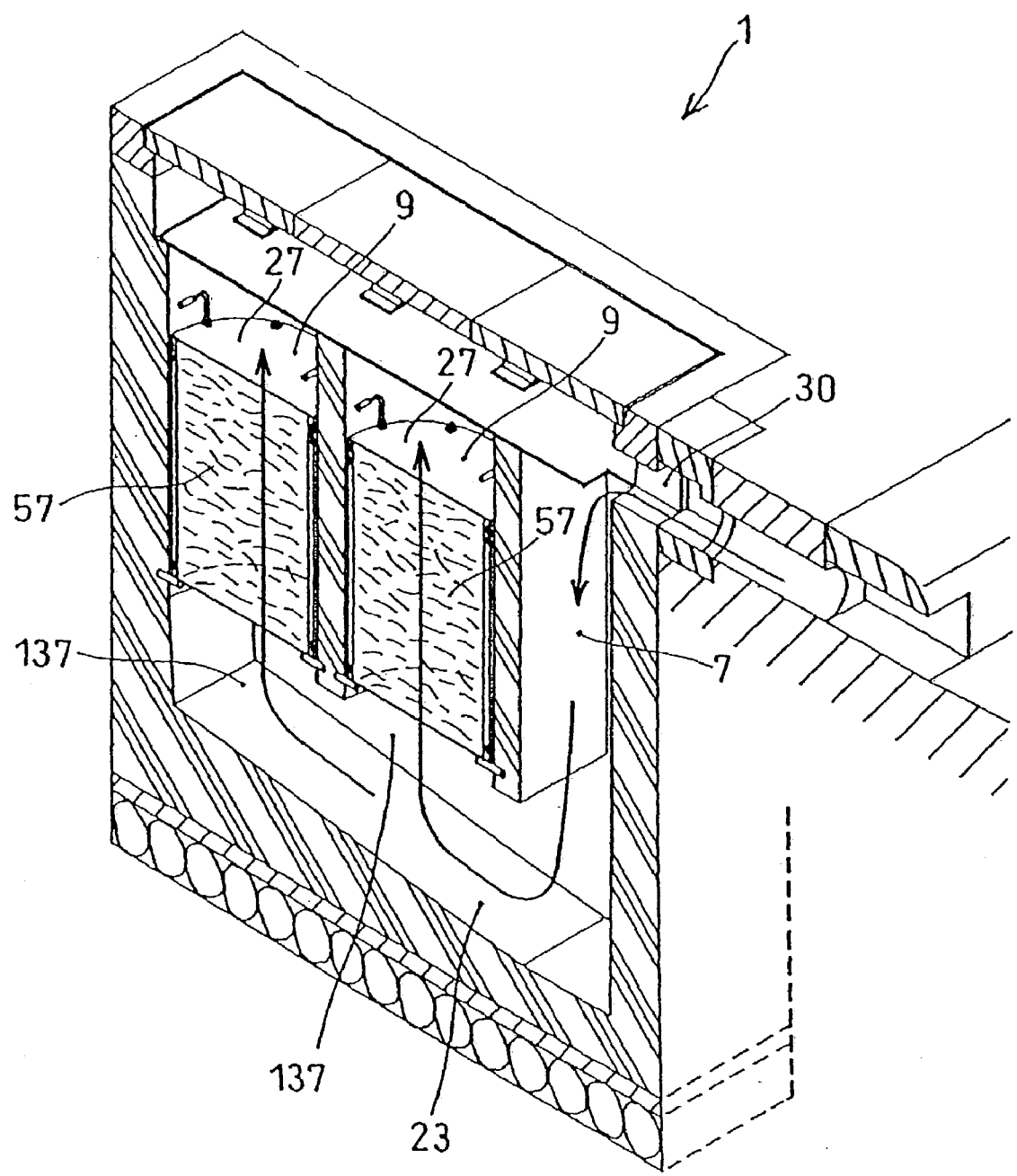
FIG. 34 is a partial cross-sectional perspective view of another embodiment of the system.
Figure 35:
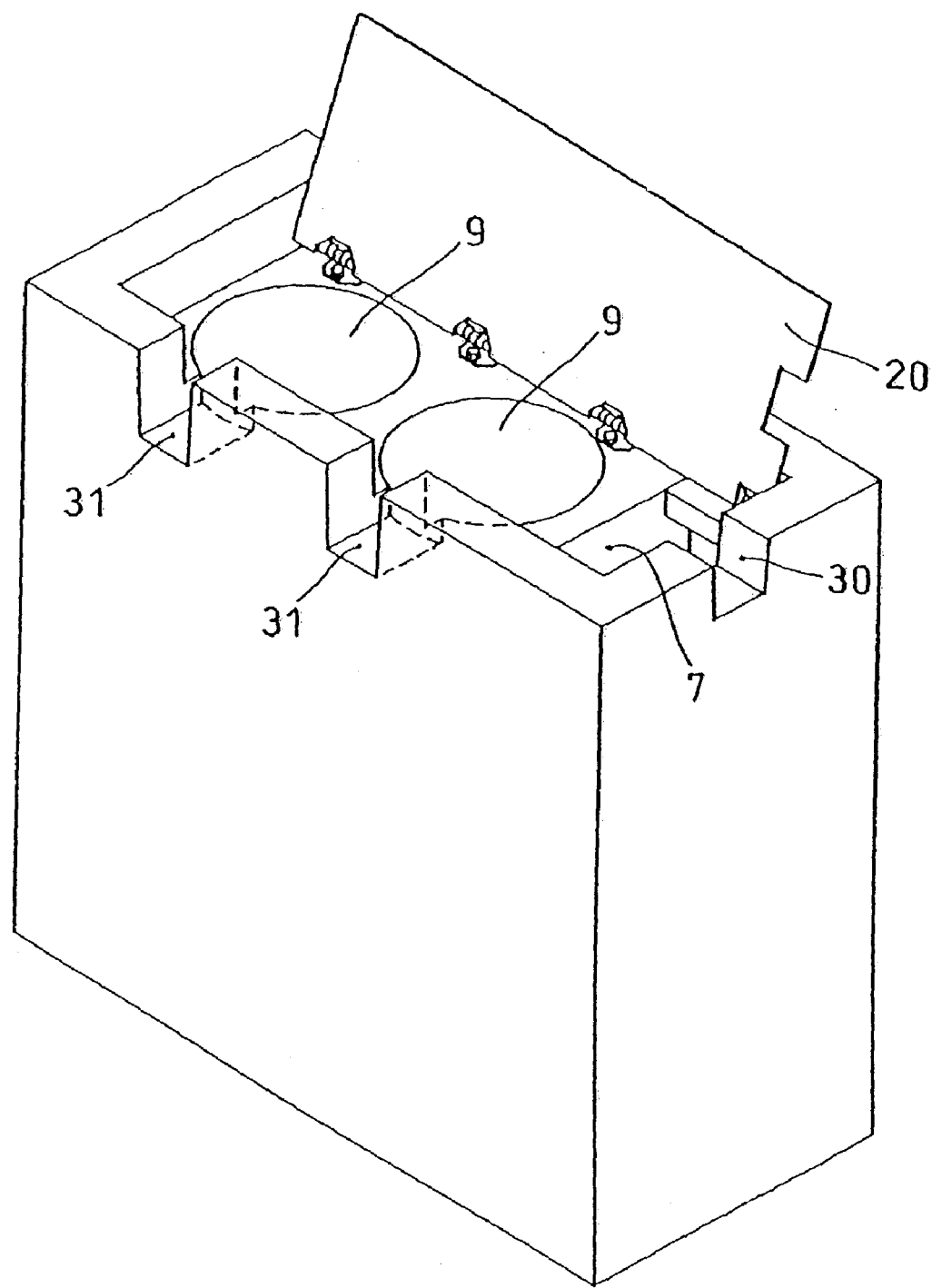
FIG. 35 is a perspective view of another embodiment of the system.

The water purification unit illustrated in FIG. 34 and FIG. 35 has two treatment tanks and both of the tanks are connected to the maintenance tank 7 at their lower ends. The runoff water flows into the maintenance tank 7 through the inlet 30, into the treatment tank 9, 9 via the connecting conduit 23, as the arrow in FIG. 34 indicates. The water is purified in the treatment tank 9 by absorption by the treatment materials and is discharged from the outlet 31.

Figure 36:
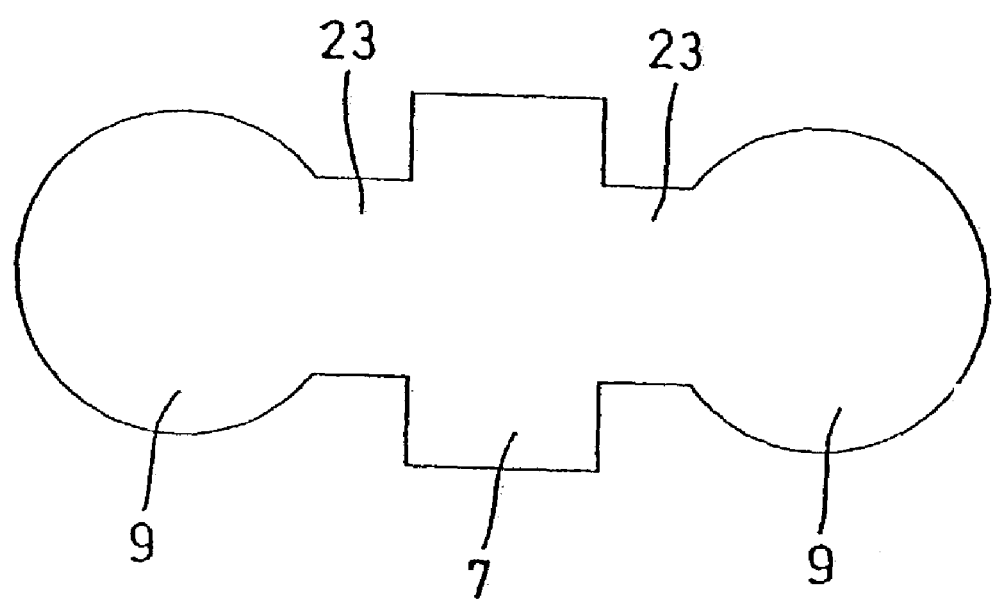
FIG. 36 is a schematic diagram of the system explaining a layout of the treatment tank and the maintenance tank.

FIG. 36 shows an embodiment of the purification apparatus which has two treatment tanks 9 at both sides of the maintenance tank 7.

Figure 37:
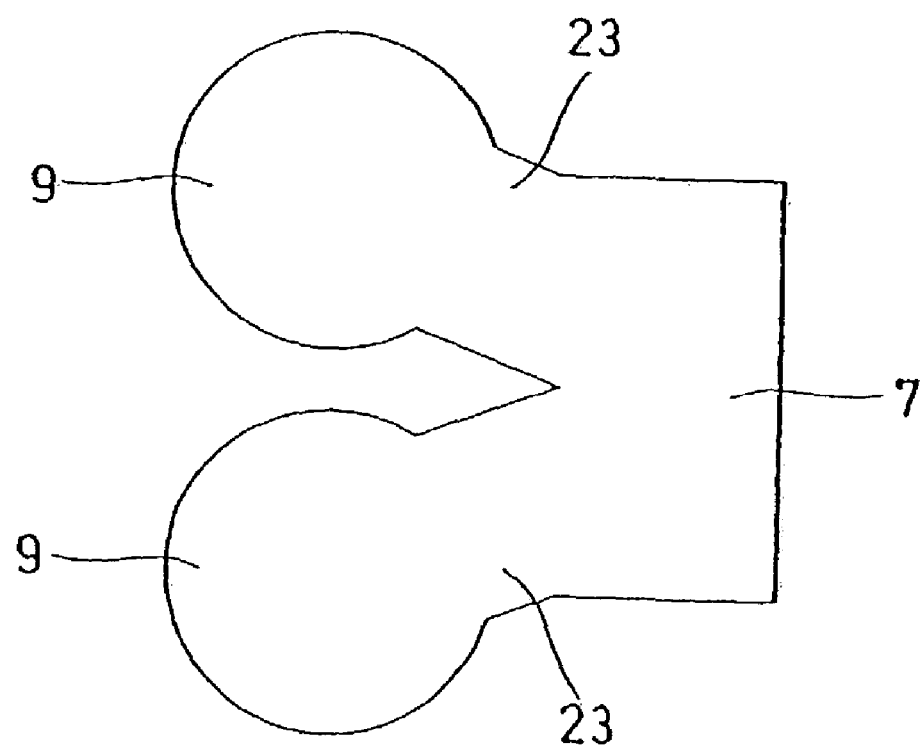
FIG. 37 is a schematic diagram of the system explaining a layout of the treatment tank and the maintenance tank.

FIG. 37 shows an embodiment of the purification apparatus which has two treatment tanks 9 at one side of the maintenance tank 7 and each of the treatment tanks 9 is connected in parallel to the maintenance tank at its lower end.

Figure 38:
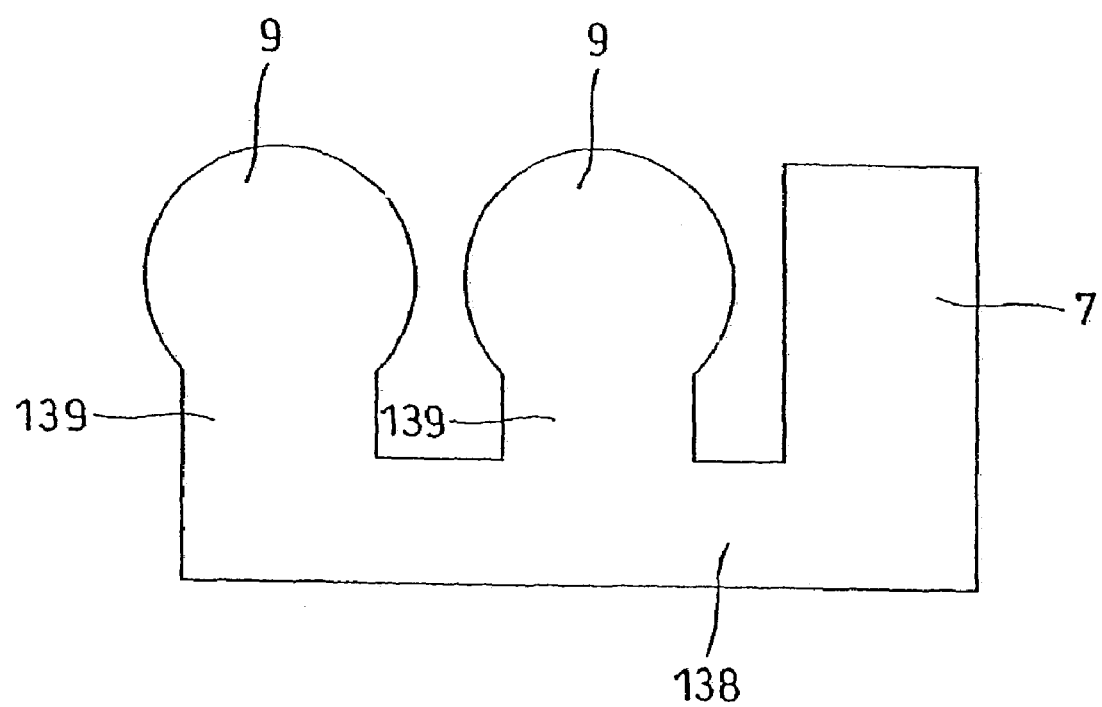
FIG. 38 is a schematic diagram of the system explaining a layout of the treatment tank and the maintenance tank.

FIG. 38 shows an embodiment of the purification apparatus which has two treatment tanks 9 at one side of the maintenance tank 7 and the treatment tanks 9 are connected to the maintenance tank 7 in series at their lower ends. It should be apparent to one of ordinary skill in the art that any number of treatment tanks can be arranged in a row.

The maintenance tank and the treatment tank are not necessarily made of concrete but can be made of steel or the like and both tanks are connected with a pipe. The apparatus also may be constructed by a cast in-situ method using concrete.

Figure 39:
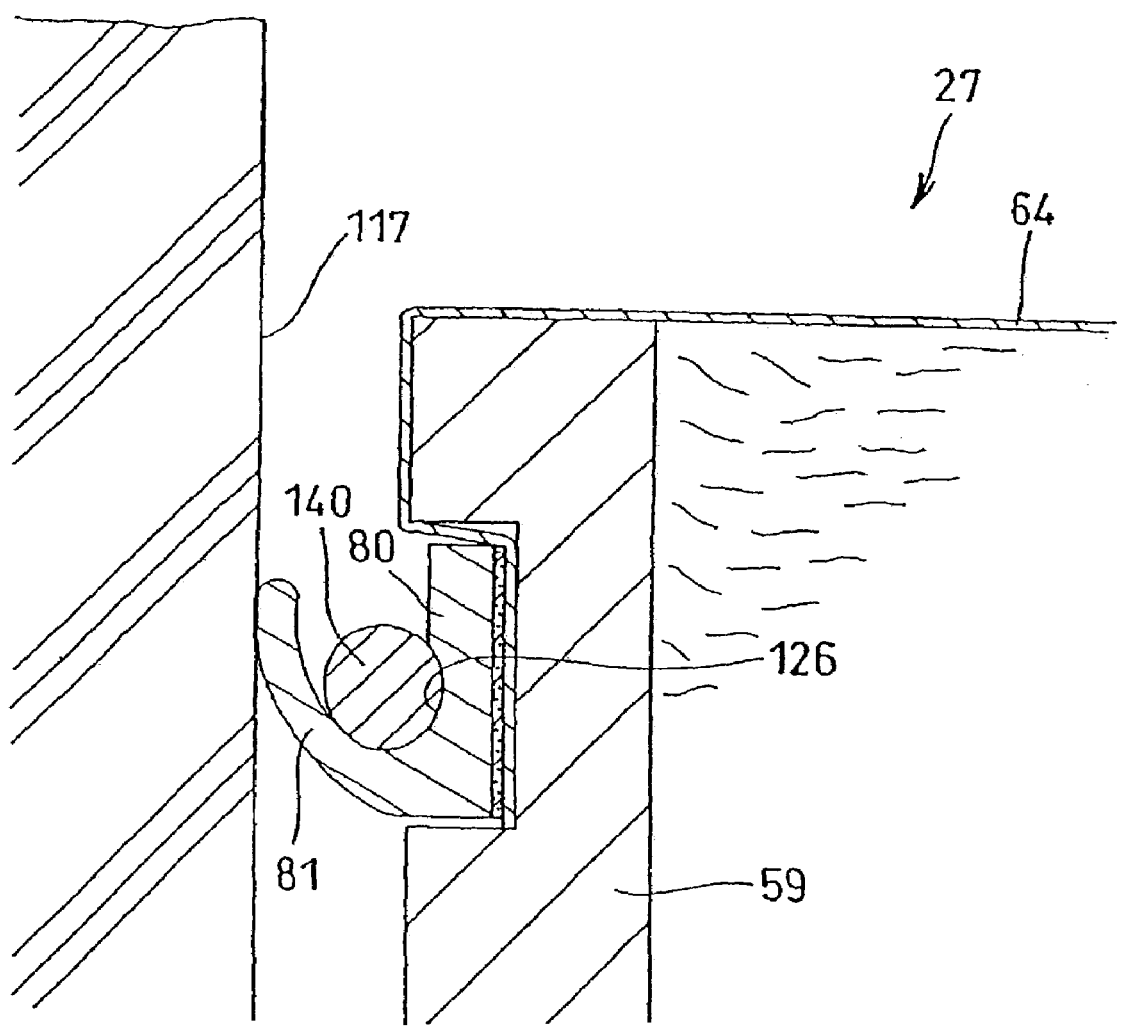
FIG. 39 is a cross-sectional view of another embodiment of the annular elastic sealing installed in the recess.
Figure 40:
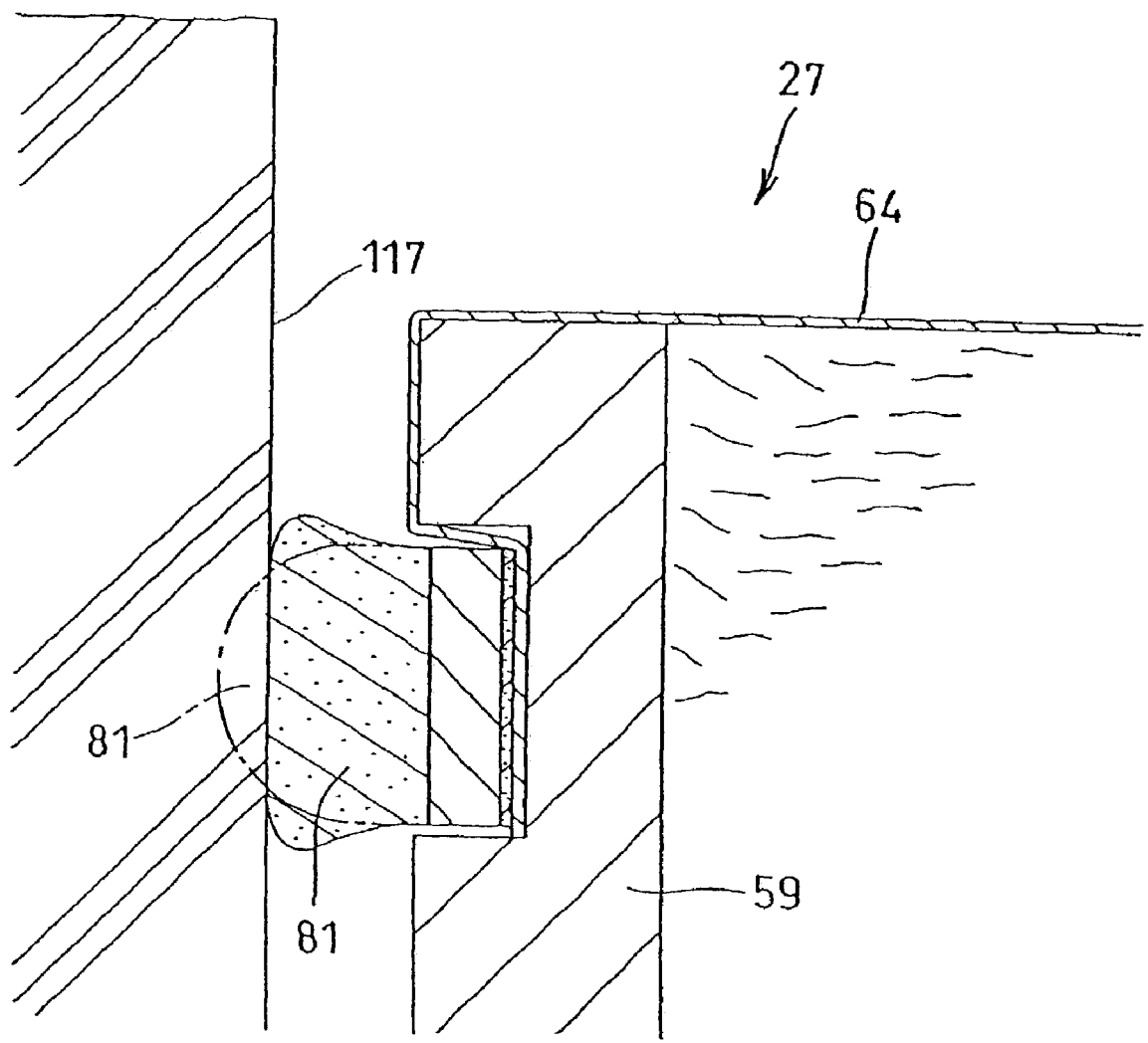
FIG. 40 is a cross-sectional view of another embodiment of the tongue of the annular elastic sealing installed in the recess.

It is also preferable to reinforce the repulsive power of the tongue 81, by inserting an elastic ring member 140 between the annular fixing band 80 and the tongue 81 as shown in FIG. 39. The elastic ring member 140 is placed in a recess which is disposed around the periphery of the fixing member 80. FIG. 40 shows another example of a sponge rubber sealing tongue, which has a semi-circular cross-sectional area.

Figure 41:
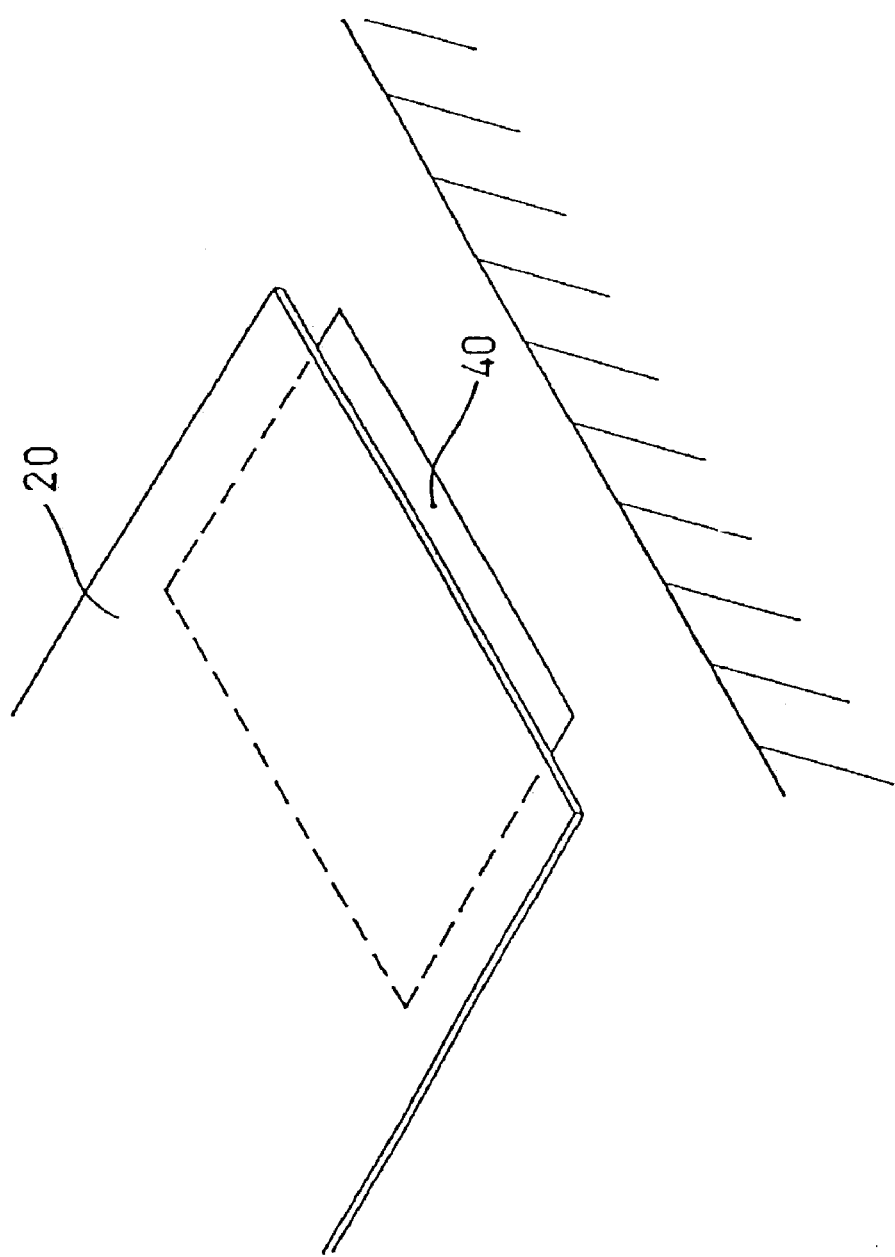
FIG. 41 is a perspective view of another embodiment of an opening of the tank.
Figure 42:
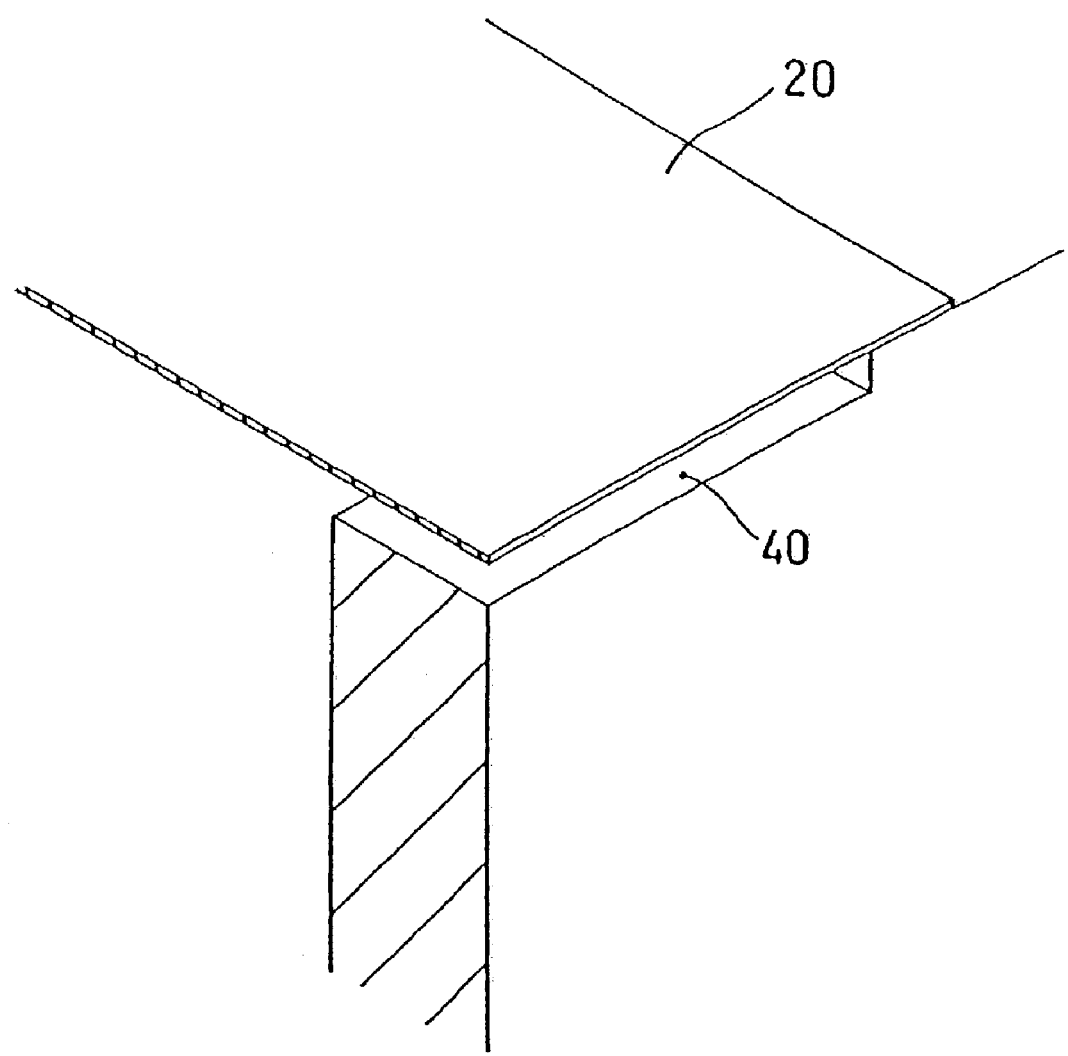
FIG. 42 is a perspective view of another embodiment of an opening of the tank.

FIG. 41 and FIG. 42 show other examples of the inlet 40. The opening 40 in FIG. 41 is opened by sliding the cover plate 20 placed on an opening of the maintenance tank 7 or the treatment tank. The opening 40 illustrated in FIG. 42 is a cutout formed at the top edge of the tank.

ADVANTAGES OF THE INVENTION

According to the invention of this application, the runoff water from road surfaces, sewage or industries and agricultural fields are purified and the pollutants on the road surfaces are not discharged into the environment. Consequently, the workload of the sewage plants receiving the runoff water is greatly reduced.

When the rainfall intensity is high, and the maintenance tank becomes full of water and cannot accept the rainfall, the excess water floods from the maintenance tank and flows over the top of the cover plate and flows toward the outlet directly by-passing the treatment tank by closing the cover plate. Therefore, the system can be designed to be compact and reduce the construction cost.

The cover plate prevents the agitation of the water in the maintenance tank and the sediment accumulated at the bottom of the tank stays still and is not discharged from the outlet.

The bottom of the outlet is lower than the bottom of the inlet, thereby the water in the treatment tank flows out by gravity and no power is needed for the system.

As the treatment materials are packed in the container, it is easy and costs less to wash, clean and exchange the treatment materials.

The gap between the tank and the container is sealed by the annular elastic band and all the water accepted by the system passes through the treatment tank, therefore, no untreated runoff water is discharged into the environment.

Since the bottom of the treatment tank is declined toward the maintenance tank, it is easy to wash and clean the maintenance tank and to remove the sediment.

INDUSTRIAL APPLICABILITY

The invention of this application removes the pollutants in runoff water and prevents the pollutants from being dispersed into the environment. It also reduces the workload of the sewage plants.

What is claimed is:

1. A road surface drain system for removing pollutants contained in runoff water, said road surface drain system comprising:

an apparatus comprising a maintenance tank and a treatment tank, the maintenance tank having an inlet for the introduction of the runoff water into the apparatus and a common wall with the treatment tank, the treatment tank containing treatment materials for removing the pollutants from the runoff water and having an outlet for discharging purified runoff water positioned at a lower height than the maintenance tank runoff water inlet and having a bottom wall which slopes downwardly toward and is in fluid communication with a bottom wall of the maintenance tank;

a discharge conduit for receiving the purified runoff water from the outlet of the treatment tank and discharging the purified runoff water from the system; and a moveable cover having an opening in communication with the inlet and for diverting the flow of runoff water from the inlet to the maintenance tank to into the discharge conduit in a closed position and allowing the runoff water to flow directly to the outlet when the maintenance tank is filled.

2. The road surface drain system of claim 1, wherein the treatment tank comprises a plurality of tanks.

3. The road surface drain system of claim 1, wherein the maintenance tank and the treatment tank form a box and an opening is provided in the lower end of the common wall for providing fluid communication between the maintenance tank and the treatment tank.

4. The road surface drain system of claim 3, further comprising a wall provided at the top of the box.

5. The road surface drain system of claim 4, wherein the wall at the top of the box has cutouts which serve as the inlet and the outlet.

6. A road surface drain system for removing pollutants contained in runoff water, said road surface drain system comprising:

an apparatus comprising a maintenance tank and a treatment tank, the maintenance tank having an inlet for the introduction of the runoff water into the apparatus and a common wall with the treatment tank, the treatment tank having treatment materials for removing the pollutants from the runoff water removably contained therein and an outlet for discharging purified runoff water positioned at a lower height than the maintenance tank runoff water inlet and having a bottom wall which slopes downwardly toward and is in fluid communication with a bottom wall of the maintenance tank;

a discharge conduit for receiving the purified runoff water from the outlet of the treatment tank and discharging the purified runoff water from the system; and a movable cover having an opening in communication with the inlet and for diverting the flow of runoff water from the inlet to the maintenance tank to into the discharge conduit by and allowing the runoff water to flow directly to the outlet when the maintenance tank is filled.

7. The road surface drain system of claim 6, wherein the treatment materials are filled in a container and a gap provided between the container and the treatment tank is sealed.

8. The road surface drain system of claim 7, further comprising a detachable handle provided at a top end of the container.

* * * * *